US006981654B2

(12) United States Patent
McKenna

(10) Patent No.: US 6,981,654 B2
(45) Date of Patent: *Jan. 3, 2006

(54) APPARATUS FOR INTERMITTENT LIQUID DISPERSAL

(75) Inventor: Quentin M. McKenna, Boulder, CO (US)

(73) Assignee: Q Industries LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/824,171

(22) Filed: Apr. 13, 2004

(65) Prior Publication Data
US 2004/0227005 A1 Nov. 18, 2004

Related U.S. Application Data

(63) Continuation of application No. 09/885,378, filed on Jun. 19, 2001, now Pat. No. 6,732,947.

(60) Provisional application No. 60/212,896, filed on Jun. 20, 2000.

(51) Int. Cl.
B05B 1/08 (2006.01)
(52) U.S. Cl. .................. 239/99; 239/533.15; 239/584; 137/529
(58) Field of Classification Search .................. 239/99, 239/533.15, 584; 137/529, 534; 251/129.15, 251/129.18, 129.21
See application file for complete search history.

(56) References Cited

U.S. PATENT DOCUMENTS

| 1,515,664 | A |   | 11/1924 | Dunkelberger |       |
|-----------|---|---|---------|--------------|-------|
| 2,949,931 | A |   | 8/1960  | Ruppright    |       |
| 3,217,736 | A |   | 11/1965 | Voss         |       |
| 3,270,763 | A |   | 9/1966  | Kiefer       |       |
| 3,297,260 | A |   | 1/1967  | Barlow       |       |
| 3,485,441 | A |   | 12/1969 | Eaton, Jr.   |       |
| 3,495,620 | A |   | 2/1970  | Raimondi et al. |    |
| 3,656,694 | A |   | 4/1972  | Kirschke     |       |
| 4,231,520 | A |   | 11/1980 | Waldrum      |       |
| 4,301,967 | A | * | 11/1981 | Hunter       | 239/99 |
| 4,349,042 | A |   | 9/1982  | Shimizu      |       |
| 4,781,217 | A |   | 11/1988 | Rosenberg    |       |
| 4,794,843 | A |   | 1/1989  | Poling       |       |
| 4,903,898 | A |   | 2/1990  | Kind         |       |
| 5,061,454 | A |   | 10/1991 | Birk         |       |
| 5,232,167 | A |   | 8/1993  | McCormick et al. | |

(Continued)

FOREIGN PATENT DOCUMENTS

DE            1250741        9/1967

(Continued)

OTHER PUBLICATIONS

Catalog: "Instrument Quality Fittings", *Value Plastics®, Inc.*, 1997.

(Continued)

Primary Examiner—Dinh Q. Nguyen
(74) Attorney, Agent, or Firm—Dorsey & Whitney LLP

(57) ABSTRACT

Valve for the periodic and cyclic or otherwise intermittent release of a fluid is described along with an irrigation sprinkler incorporating the valve. The valve opens when a critical pressure level is reached in a reservoir attached to the valve, thereby permitting a portion of the fluid contained within the reservoir to be released through the valve. As the fluid is released, the pressure in the reservoir decreases. The valve does not close until the pressure level in the reservoir reaches a second pressure level that is below the critical pressure level. When the reservoir is refilled from a pressurized source at a controlled rate that is less the rate at which the fluid is expelled through the valve when open, the valve will cycle repetitively.

20 Claims, 15 Drawing Sheets

U.S. PATENT DOCUMENTS

| | | | |
|---|---|---|---|
| 5,236,174 A | 8/1993 | Vogt et al. | |
| 5,341,994 A | 8/1994 | Wakeman | |
| 5,507,436 A | 4/1996 | Ruttenberg | |
| 6,732,947 B2 * | 5/2004 | McKenna | 239/99 |

FOREIGN PATENT DOCUMENTS

| | | |
|---|---|---|
| DE | 2425518 | 2/1975 |
| DE | 271937 | 9/1989 |
| GB | 951777 | 3/1964 |
| GB | 1456322 | 11/1976 |
| JP | 58-170982 | 10/1983 |
| JP | 1-88783 | 7/1989 |
| SU | 263268 | 11/1970 |
| SU | 1212597 | 2/1986 |

OTHER PUBLICATIONS

Brochure: "Flexible Magnetic Strips & Sheets", *Bunting Magnetics Co.,* pp. 1 and 3, date unknown.

Brochure: "Premium Pneumatic Products", *Nycoil,* pp. 1 and 33, date unknown.

Catalog and Price List: *Olson Irrigation Systems,* pp. 1, 12, and 16, available as early as 1998.

Brochure: "Challenger Micro Sprinkler", *Wisdom Industries, Inc.,* available as early as 1988.

Brochure: "Split Collars Selection Sheet", *American Collars and Couplings, Inc.,* pp. 1 and 4, date unknown.

* cited by examiner

APPARATUS FOR INTERMITTENT LIQUID DISPERSAL

CROSS REFERENCE TO RELATED APPLICATION

This application is a continuation of and claims priority to U.S. patent application Ser. No. 09/885,378, entitled "Apparatus for Intermittent Liquid Dispersal" filed on Jun. 19, 2001 now U.S. Pat. No. 6,732,947, which claims priority from U.S. Provisional Patent Application No. 60/212,896, entitled "Apparatus for Periodic Liquid Dispersal" filed on Jun. 20, 2000, the disclosures of both applications are hereby incorporated by reference herein.

FIELD OF THE INVENTION

The present invention relates generally to intermittent liquid dispersal and more particularly to intermittent liquid dispersal for irrigation and pest control.

BACKGROUND OF THE INVENTION

A wide variety of irrigation systems are commercially available for use in watering crops, plants, and lawns. Sprinkler-based systems are generally the most popular, although systems that deposit water directly on the ground are also utilized, such as drip systems. In either case these systems are often automated so that they irrigate an associated area on a periodic basis without substantial human intervention.

Automated systems typically comprise an electronic controller and solenoid valve electrically coupled to the controller. The solenoid valve is typically located inline with a pressurized source of water. In operation, the valve opens to allow water to flow from the source, through a conduit, and out one or more sprinkler heads or drip emitters. When the cycle is complete, the controller signals the solenoid valve to close. Typically, these systems operate no more than a few times in day. A typical watering cycle may last anywhere from a few minutes to more than an hour.

After a watering cycle has been completed, it is not uncommon for the ground to be soaked and saturated. In the intervening period between cycles, the soil can become arid, especially in hot and dry climates. Both saturated and arid ground conditions can be damaging to certain types of plants. For instance, a seedling without a developed root system can be dislodged from the soil if enough water is added to the ground to cause puddling. Additionally, if the ground around a seedling is allowed to dry completely for even a short period of time the seedling can quickly dehydrate and die. Furthermore, there are types of plants that have root systems that are very intolerant of saturated soil conditions and can be damaged if exposed to saturated soil on a regular basis.

Ideally, it would be desirable to maintain soil at a predetermined and constant moisture level that is ideal for the plants growing therein. Increasing the frequency of irrigation cycles while reducing the time there between helps to maintain the soil at a more constant moisture level, but most electronic controllers are designed only to open an associated solenoid at most a few times every day. Even if controllers were available that allowed frequent watering cycles of short duration, the electronic solenoids generally available for use in sprinkler systems are not designed for continuous repetitive duty.

Another drawback of electronic systems is that they require coupling to an electrical power source that may not be conveniently available. Additionally, the conduits of electrical current, such as the wires between the solenoid and the controller, must be protected from moisture and other potential sources of damage. These requirements of traditional automatic systems make them complicated and consequently difficult and expensive to install.

Another problem that traditionally affects farmers and home gardeners alike is damage done to plants and crops by animals. It can be appreciated that animals in general will not bother plants or crops while a sprinkler is in operation because either they do not like the water or they are scared by sprinkler noise. Traditional sprinklers are relatively effective in deterring animals from entering an area being irrigated. Unfortunately, traditional sprinklers cannot be left on continuously for extended periods of time because of the amount of water used and the potential saturation of the underlying soil. Other objects, such as scarecrows, have very little effect on most animals. There are solutions that can be applied to the surfaces of plants that make them undesirable to animals, although the nature of the solutions often preclude there use on crops that are to be consumed by humans.

SUMMARY OF THE INVENTION

Various embodiments, presentations, and configurations of a valve for the intermittent distribution of a fluid according to the present invention is described herein. In one embodiment, the valve includes a valve housing defining an interior cavity and a valve member that is at least partially contained within the cavity. The fluid is in a reservoir capable of holding the fluid under pressure. An inlet port is provided to receive the fluid into the cavity of the valve housing and an outlet port is provided to permit the fluid to flow out of the cavity. The valve member is moveable within the cavity between a closed position and open position. In the closed position, the valve member blocks the flow of the liquid in the cavity between the inlet port and the outlet port. In the open position, the valve member permits the flow of the fluid between the inlet port and the outlet port. Additionally, a biasing mechanism is provided to control the movement of the valve member between the closed and open positions. In particular, the biasing mechanism provides (i) a retention force applied against the valve member to hold the valve member in the closed position when the valve member is in the closed position, and (ii) a biasing force encouraging the valve member into the closed position when the valve member is in the open position, the biasing force being less than the retention force, in one example.

In another embodiment, the valve housing defines a bore with the inlet port and the at least one outlet port extending through a wall of the housing from the bore. The inlet port is adapted for coupling to the source of liquid, and is in fluid communication with the at least one outlet port through the bore. The valve further includes a valve stem that is at least partially contained within the bore. The valve stem is movable between an open and closed position in the bore (the stroke), wherein the valve stem blocks the flow of liquid between the inlet and outlet ports in the closed position and permits the flow of liquid between the inlet and outlet ports in the open position. A biasing mechanism is provided that applies a retention force to hold the valve stem in the closed position within the bore when the valve stem is in the closed position. Additionally, the biasing mechanism provides a return force encouraging the valve stem into the closed position when the valve stem is in the open position, wherein the magnitude of the return force is less than the retention force. The stroke may be set by a retention strap or the like. In addition, the bore may define a second enlarged section of the bore, and the valve stem may include a stopper adapter to operate within the bore and thereby control the stroke.

In embodiments of the present invention, the biasing mechanism comprises two sets of one or more magnets, one coupled with the valve housing and the other with the valve stem. The retention force at least partially comprises the magnetic force between the magnets. Furthermore, the valve may include one or more O-rings that span the distance between the surface of the valve stem to the interior surface of the bore.

In other embodiments of the invention, a valve generally similar to those described above is utilized in conjunction with a reservoir designed to hold a fluid in a pressurized state. Operationally, the valve member moves into the open position from the closed position when the pressure in the reservoir exceeds a critical level, i.e., an activation force is equal to or exceeds the retention force. The valve member does not move back into the closed position from the open position until the pressure level in the reservoir drops to a second level that is less than the critical pressure level. Accordingly, a volume of liquid that is the difference between the volume of liquid contained within the reservoir at the critical pressure and the volume of liquid stored in the reservoir at the second pressure level is expelled from the reservoir through the periodic fluid release valve.

In another preferred embodiment, the reservoir is fluidly coupled to a pressurized source of liquid by way of a flow control regulator that controls the rate at which the reservoir is filled. A combination system including the regulator, the reservoir and the periodic control valve facilitates the repetitive cyclic release of liquid from the outlet port of the valve when a pressurized source of liquid is provided.

A fluid delivery system for periodic fluid dispersal and a method for the same are described herein. Embodiments of the present invention incorporate a pressure actuatable periodic fluid dispersion valve (periodic valve) as described below coupled with and located downstream from a reservoir containing a fluid. The reservoir is fluidly coupled with a fluid source with a flow regulator valve (regulator) intervening to control the flow rate of fluid from the fluid source.

In one embodiment, fluid flows into the reservoir from the source at a rate controlled by the regulator. The reservoir contains the fluid and expands as the volume of fluid in the reservoir increases. At a critical pressure, the periodic valve is triggered into an open position, wherein a portion of the fluid contained within the reservoir is expelled therefrom through the periodic valve. Once the pressure in the reservoir drops below a certain level that is generally lower than the critical pressure, the periodic valve closes.

In another method, the various embodiments of the valve are useful in forming a fire line to help prevent the movement of a fire passed a certain point. To form a fire line with the present invention, a plurality of sprinkler heads are distributed over an area of ground typically in a line. Each sprinkler head is fluidly coupled with the valve, and each valve is fluidly coupled with a reservoir. A source of fluid, such as water or other fire-line agents, is fluidly coupled with the reservoir so that the reservoir fills and the fluid therein is pressurized. The area of the ground in the broadest range of the sprinkler may then be kept at a level to reduce fire by the periodic dispersal of water from the periodic fluid dispersal valve assembly.

The operation of the periodic valve is in contrast to spring-loaded safety release valves that are commonly found on pressure vessels. Safety release valves open when a critical pressure is reached but close immediately once the pressure within an associated pressure vessel or reservoir decreases below the critical pressure. The volume of fluid released from a safety release valve is typically small, depending on the influx of fluid into the reservoir or pressure vessel from a pressurized source.

For purposes of illustration, the invention is described herein in terms of a periodic sprinkler for use in the irrigation of plants, lawns or crops and for use in forming a fire-line, as well as startling critters that may be after the crop. It is to be understood that other embodiments of the invention are contemplated for use wherever the periodic distribution of a fluid, liquid or gas, is required.

BRIEF DESCRIPTION OF THE DRAWINGS

FIG. 15 is an isometric view of another embodiment of the present invention, having a flexible riser so that the sprinkler head may be adjusted to match the terrain that the valve is being used on.

DETAILED DESCRIPTION

Figure 1:
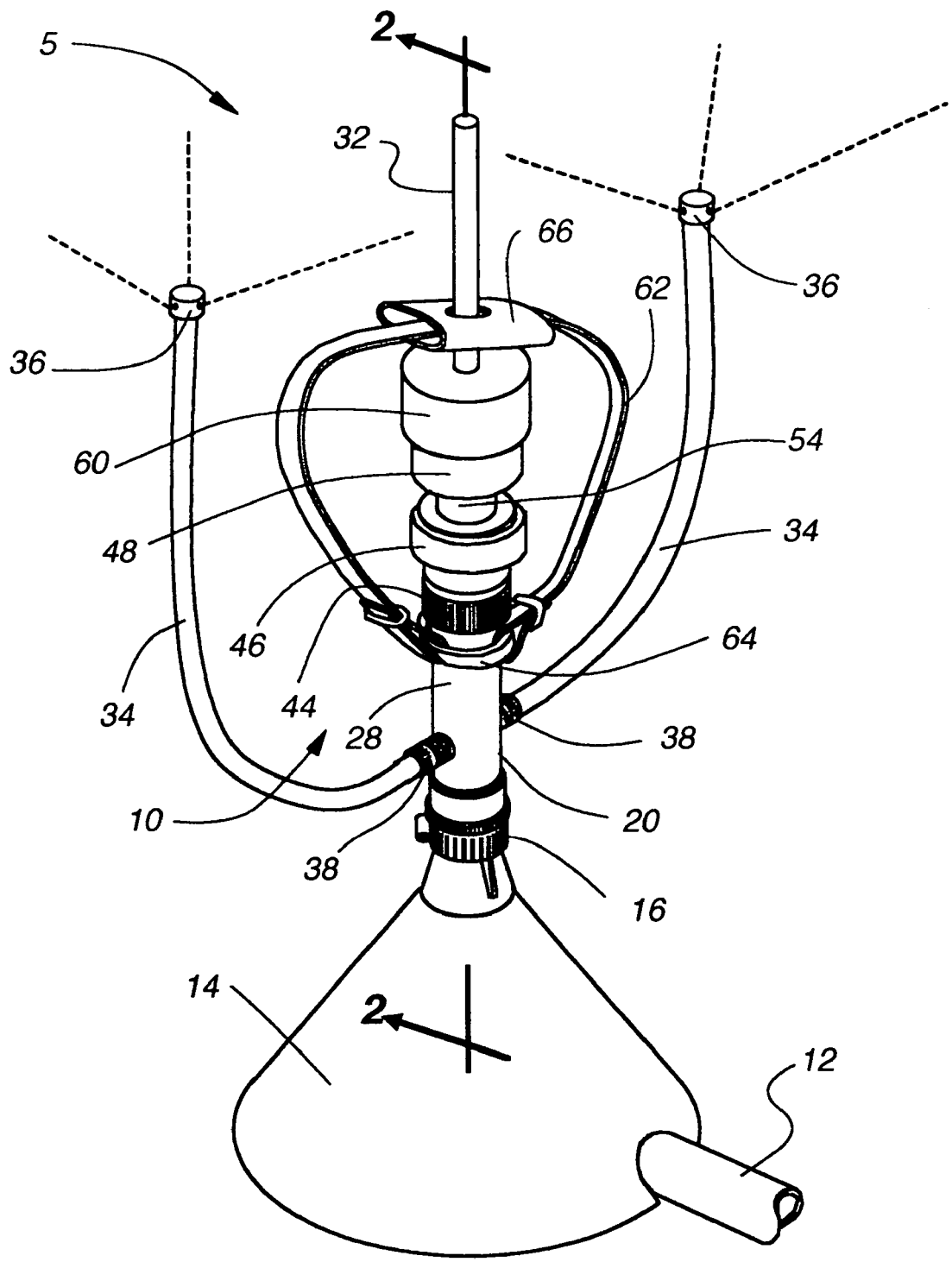
FIG. 1 is an isometric view of a first embodiment of the present invention.
Figure 2:
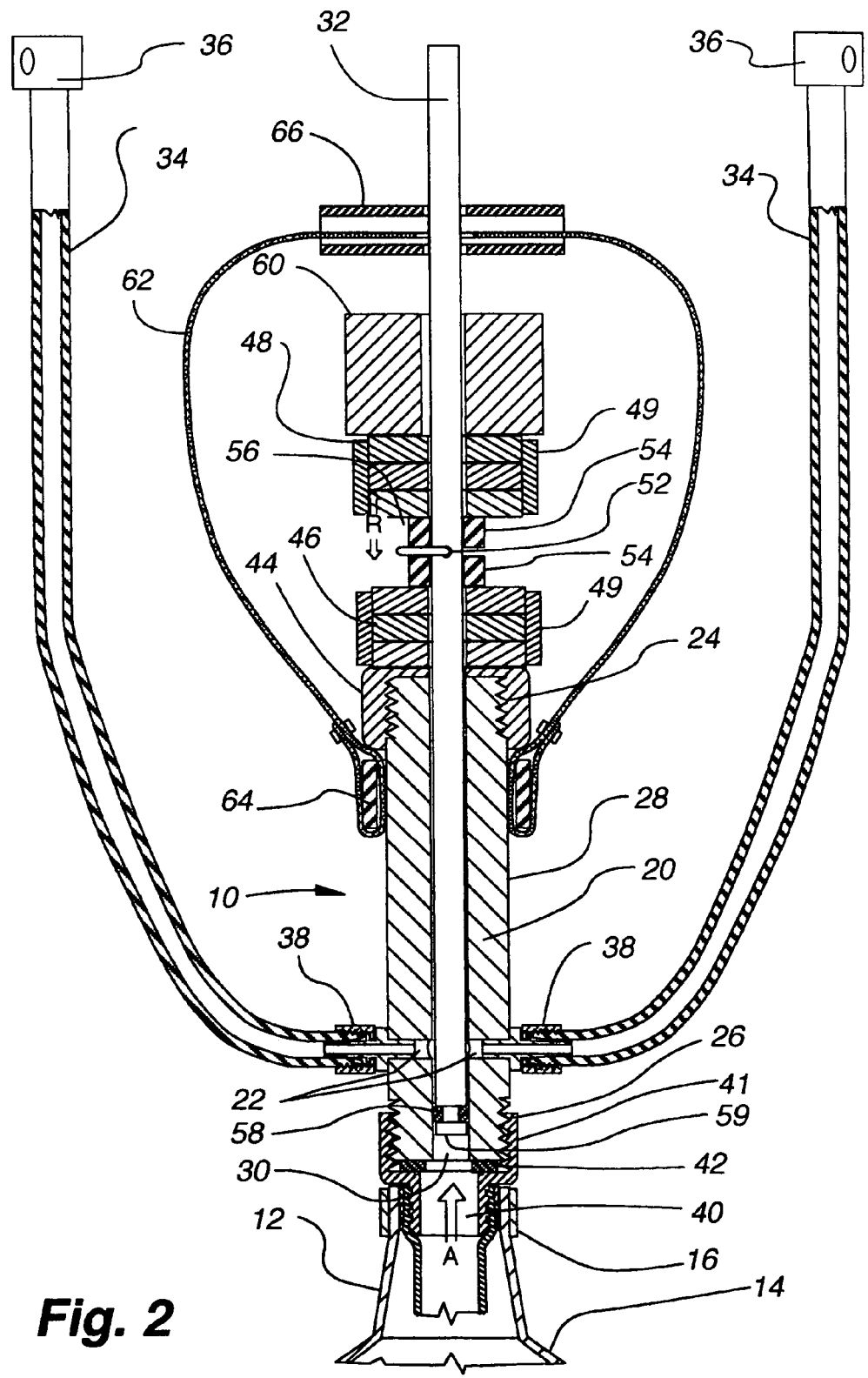
FIG. 2 is a section view of the first embodiment taken along line 2—2 of FIG. 1, and illustrating the valve in the closed position.
Figure 3:
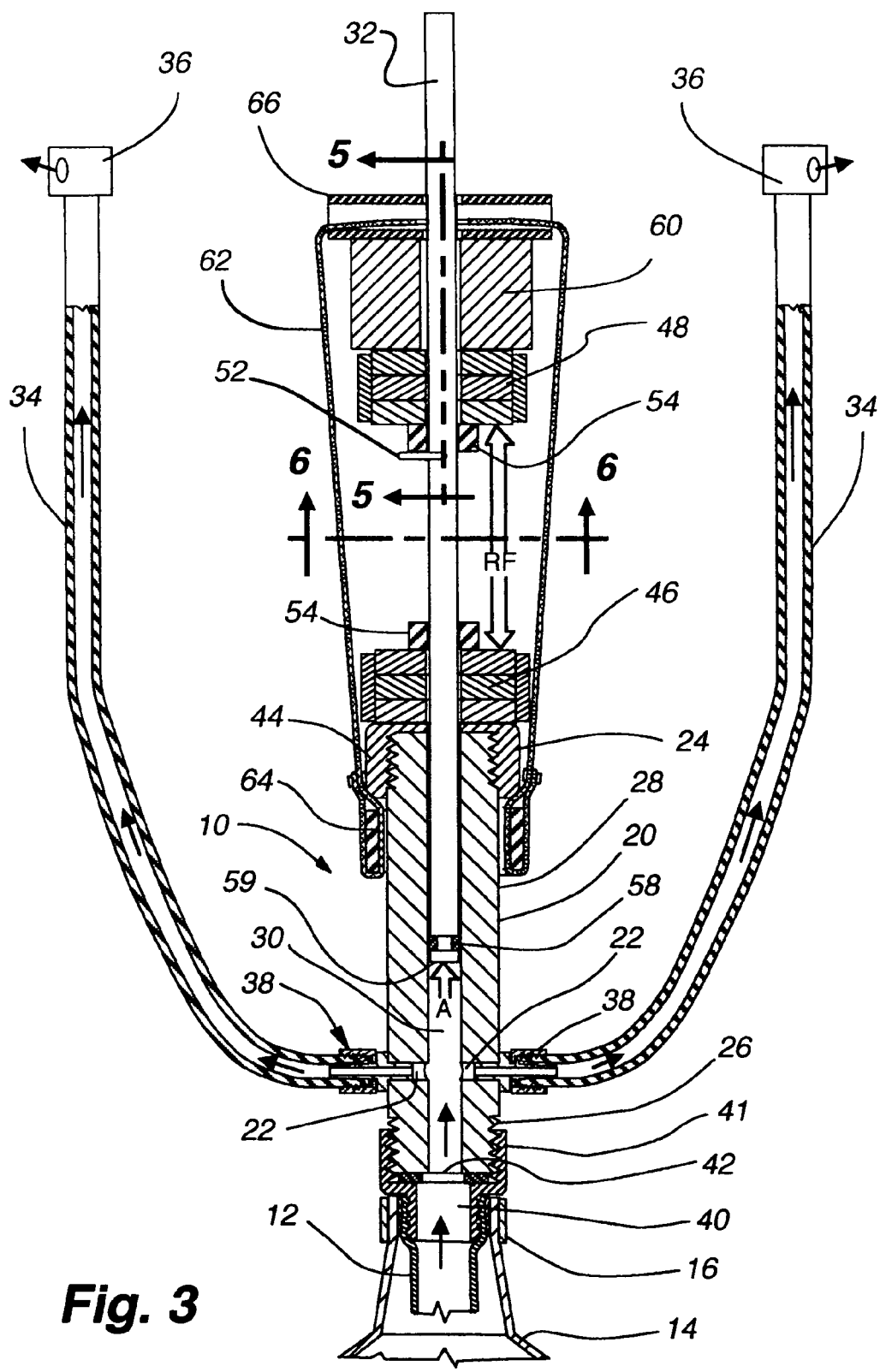
FIG. 3 is a section view of the first embodiment, and illustrating the valve in the open position.
Figure 4:
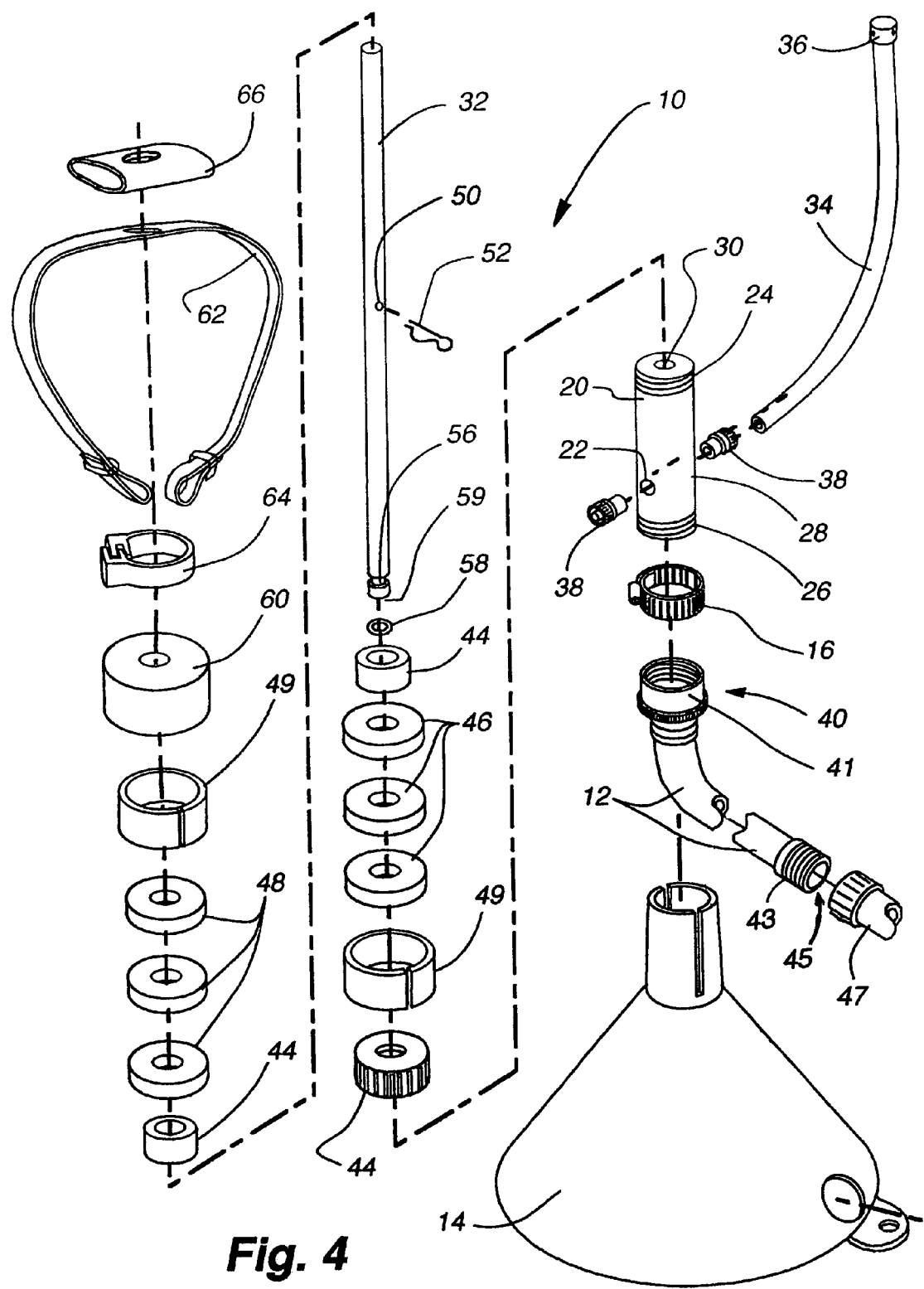
FIG. 4 is an exploded isometric view of the first embodiment.

FIG. 1 illustrates a perspective view of a sprinkler 5 including a intermittent liquid emitter valve ("valve") 10 according to one embodiment of the present invention. FIG. 2 illustrates a section view of the valve 10 taken along line 2—2 of FIG. 1, and illustrating the valve 10 in the closed position. FIG. 4 is an exploded view of the valve 10 according to the first embodiment, and particularly illustrates each component of the valve 10, in one example. FIG. 3 also illustrates a section view of the valve 10, but with the valve in the open position. Generally, the valve 10 periodically and cyclically or otherwise intermittently emits a fluid in response to a pressure increase in a reservoir 12. As used herein, "fluid" includes a liquid, a gas, a combination thereof, and any material that exhibits fluid characteristics, i.e., the material is able to flow or move freely.

Referring to FIGS. 1 and 2, the valve 10 is supported by a base 14 adapted to hold the valve 10 in a generally vertical orientation. The base 14, in one example, is conically shaped with an opening at the apex of the base, wherein a bottom end of the valve 10 is slid into the opening and secured therein by a clamp 16. Within the base 14, the bottom of the valve 10 is fluidly coupled with an at least partially elastic reservoir 12. A partial portion of the reservoir 12 is shown exiting from the base 14 in FIG. 1.

Referring primarily to FIGS. 1–4, the components of the valve 10 of the first embodiment are described. The valve 10 includes a valve housing 20 defining a longitudinal bore 30 and at least one outlet port 22. In one example, there are two outlet ports, with each outlet port 22 having a diameter of $^{11}/_{64}$ inches. The valve housing 20 is an elongate cylinder with a threaded top portion 24, a threaded bottom portion 26, and a sidewall 28 extending between the top portion 24 and the bottom portion 26, in one example. The valve housing 20 is typically fabricated from a polymeric material having a low coefficient of friction, such as Teflon™. The threaded top portion 24 and threaded bottom portion 26, in one example, conform to the $^3/_4$-11.5 ANSI standard (external) hose coupling thread, with the threaded portion extending about $^7/_{16}$ inches.

The longitudinal cylindrical bore 30 extends through the valve housing 20 between the top portion 24 and the bottom portion 26, and has a diameter of about ¼ inch, in one example. The bore 30 is adapted to receive a valve stem 32. The outlet ports 22 are located above the bottom threaded portion 26 of the valve housing 20. Generally, the outlet ports 22 are perpendicular to the bore 30 and the sidewall 28, and form an aperture therebetween. The embodiment illustrated in FIGS. 1–6 includes two outlet ports 22. It is envisioned, however, that the valve housing 20 includes at least one outlet port, and may include any number of outlet ports required to facilitate a particular fluid distribution pattern.

A liquid distribution channel 34 or conduit is fluidly coupled with the outlet port 22. In the embodiment illustrated in FIGS. 1–6, there are two liquid distribution channels 34 fluidly coupled with the two outlet ports 22, respectively. In one example, the channels 34 are defined by a polyethylene tubing having a 4 mm inside diameter ("I.D."), which may be bent, such as through use of a heat gun, into a variety of distribution patterns according to the needs of a particular user. It is envisioned that other conduits, such as stainless steel, rubber hose, pre-formed tubing, adjustable tubing, ball-and-socket piping, and the like may be used. In the embodiment of FIGS. 1–6, the tubes 34 extend transversely from the valve 10 and then bend upwardly and substantially vertically, with the end of the tube 34 generally above the valve 10 so as to allow unimpeded liquid distribution from a sprinkler head 36 at the upper end of the channel. The tubing is available from United Green Mark, Inc., 15579 E. Hinsdale CR #200, Englewood, Colo. A fitting 38 that has a bore extending through it is press-fit into each of the outlet ports 22. Each tube 34 has a threaded lower end that is received into a threaded section of the fitting bore. The sprinkler heads 36 illustrated in FIG. 1 have a plurality of openings from which water pulses. The sprinkler heads 36 are press-fit in the upper end of the tube 34. The sprinkler heads 36 are available from numerous sources, including Spotjet, 14452 Chestnut Street, Westminster, Calif. 92683.

An outlet portion 40 (shown best in FIGS. 2–4) of the liquid reservoir 12 is fluidly connected with the bottom threaded portion 26 of the valve housing 10. In one example, the liquid reservoir 12 is fluidly connected with an inlet portion 42 of the bore 30 by a section of conduit 41, which is threadably connected with the threaded bottom portion 26 of the valve housing 10. In the embodiment shown in FIGS. 1–6, a garden hose has been found to be effective as a reservoir 12, wherein the length of the reservoir is directly related to the volume of water that will be released during each cycle of the valve 10. It can be appreciated that in variations of the first embodiment, and other embodiments described herein, the same garden hose that is used to carry water from a source to the valve 10 may also double as a reservoir 12. In one example, the reservoir 12 may be formed from any resilient elastic material that expands under pressure entering therein and stores energy, and releases the energy by expelling the fluid when an outlet for the fluid is provided. An inlet portion 43 of the reservoir 12 (shown in FIG. 4) is fluidly connected with a liquid supply 47. An inlet valve or regulator 45 is situated between the inlet 43 of the reservoir 12 and the fluid supply 47 to govern the flow rate of fluid into the reservoir. In one example, the inlet portion 43 of the reservoir 12 defines a threaded male connection adapted to engage a threaded female connection of the fluid supply. The outlet portion 40 of the reservoir is in fluid communication with the inlet portion 42 of the bore 30.

The inlet valve 45 allows fluid, such as water, to flow into the reservoir 12 from a source of fluid, such as a standard garden hose fluidly connected with a domestic water tap. In one example, the regulator 45 is a commonly available one-way emitter press-fit into the inlet 43 end of the reservoir 12 that permits the flow of water from the source at a given rate, and in other variations, the regulator is a standard bib or similar type adjustable valve that is only partially opened to restrict the flow of water therethrough. The emitter allows liquid to flow into the reservoir at a desired rate from the liquid, e.g., 1 gallon/hour, according to the emitter used, which, in one example, functions to control the cycling rate of the valve. Liquid flows into the reservoir 12 through the emitter and increases the pressure in the reservoir. As discussed below, the liquid is prevented from flowing out of the outlet portion 40 of the reservoir 12 until a retention force (R) is met or exceeded by the pressure in the reservoir, which acts as an activation force (A) on the bottom of the valve stem 32.

In the first embodiment, the partially elastic reservoir 12 expands volumetrically when pressurized. When the valve 10 is opened, the partially elastic walls contract and force the water contained therein into the bore 30 as the walls contract into their nominal position. Accordingly, the reservoir 12 contains a greater volume of water at the pressure when the valve opens than it holds at the pressure level at which the periodic valve 10 closes. It is generally the difference in these volumes that is expelled from the reservoir 12 during each operational cycle of the valve 10. If a substantially rigid reservoir were utilized, very little water, perhaps a negligible amount, would be expelled from the rigid reservoir before the pressure therein dropped below the level at which the periodic valve would close, since liquids are incompressible fluids. In embodiments of the invention adapted for use with compressible gaseous fluids, a rigid reservoir can be used since the expansion of the gas would act to maintain pressure therein. Furthermore, a rigid reservoir can be utilized with a liquid, if a portion of the reservoir contains a gas or other compressible medium, which expands as the liquid contained therein is expelled.

The valve stem 32 projects upwardly from the bore 30 adjacent the threaded top portion 24 of the valve housing 20. The valve stem 32, as best shown in FIG. 4, is fabricated from a rigid material that is resistant to corrosion from whatever fluid that is to be distributed from the valve 10. In one example, the valve stem 32 is made of stainless steel with a 0.250+0/−0.001 inch diameter, and a length of 9 inches. Additionally, in one example, a small about 1/16 inch hole 50 is drilled through the valve stem 32 about 4.75 inches above the bottom of the valve stem to accept a hitch pin 52 (which is described in more detail below). The surface of the valve stem 32 is typically smooth to reduce its coefficient of friction, which provides smooth movement of the valve stem 32 within the bore 30. In one example, the bore hole has a diameter that is slightly larger than the diameter of the valve stem 32, which substantially reduces any contact between the valve stem 32 and the bore 30, and which causes an O-ring 58 to be the only portion of the valve stem assembly that contacts the bore 30. The O-ring 58, discussed in further detail below, prevents fluid from flowing through the valve 10 until the retention force (R) is met or exceeded by the activation force (A).

A cap 44 is threadedly engaged to the top portion 24 of the valve housing 20. The cap 44 defines an aperture for the valve stem 32 to pass through which, in one example, has a 3/8 inch diameter aligned with the longitudinal bore 30. At least one magnet 46 (lower magnet) is attached to the cap 44, such as by 3M Scotch Grip™ 1099 plastic adhesive. In this embodiment, three ceramic ring magnets 46 are connected with the cap 44. Like the cap 44, the magnets 46 define an aperture in alignment with the cap aperture that allows the valve stem 32 to pass therethrough. In another variation, a thin brass tube (not shown) having a diameter similar to the inside diameter of the lower ring magnets 46 is passed through the center apertures of the lower magnets and the cap 44. The ends of the tube, which extend beyond the cap 44 and lower magnets 46 at either end, are then flared outwardly over the corresponding surfaces to hold the magnets 46 and cap 44 together.

Figure 5:
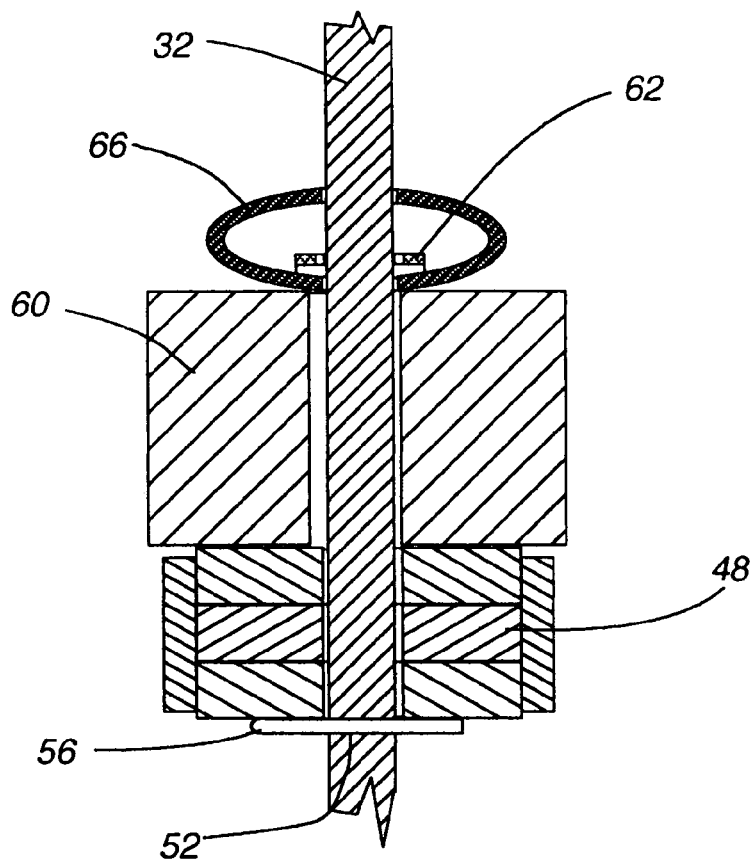
FIG. 5 is a partial section view of the first embodiment taken along line 5—5 of FIG. 3.
Figure 6:
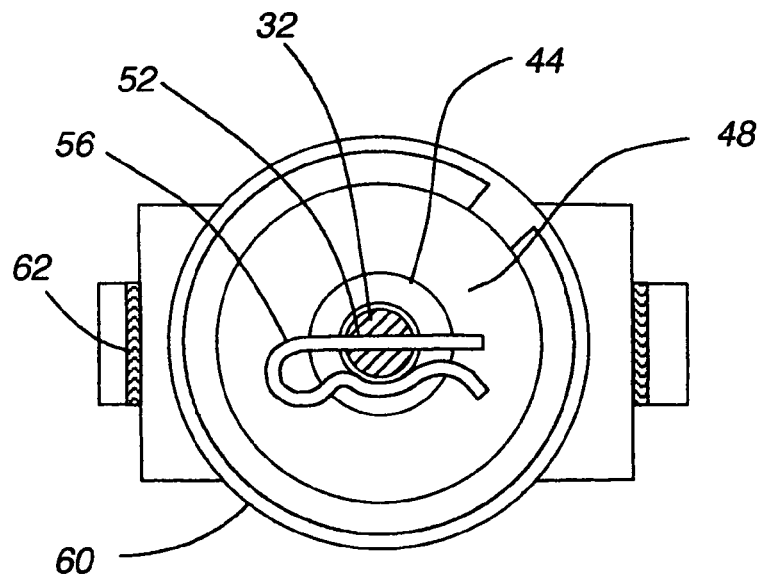
FIG. 6 is a partial section view of the first embodiment taken along line 6—6 of FIG. 3.

In addition, at least one magnet (upper magnet) 48 is coupled with the portion of the valve stem 32 that projects upwardly from the bore 30. The upper magnets 48 are adapted to magnetically engage the lower magnets 46 and thereby provide the retention force (R), which holds the valve stem 32 down in the closed position against the activation force (A). In one example, the upper and lower magnets are CR145 type 5 magnets. It is not necessary for the upper 48 and lower magnets 46 to contact. In this embodiment, an upper portion of the valve stem 32, which is contiguous with the lower portion, extends above the top portion 24 of the valve housing 20, through the aperture in the cap 44, and through the apertures in the lower magnets 46. The horizontal hole 50 extends through the upper portion of the valve stem 32 to receive the hitch pin 52 (such as a Western Wire Clip™ no. 237 from Western Wire Products Company, 770 Sun Park Drive, Fenton, Mo.), cotter pin, or the like, as best seen in FIGS. 4–6. As shown in FIG. 4, an upper bumper 54, such as a section of latex tubing having 2¼ inch I.D. and 9⅜ inch outside diameter ("O.D."), is supported on the hitch pin 52. In this embodiment, the upper magnets 48 rest on the upper bumper 54.

Generally, ceramic magnets are fairly brittle and therefore susceptible to chipping and cracking. To reduce the likelihood of damage to the upper magnets 48, one or more tubular rubber or synthetic spacers (see 468, 470 of FIG. 16) can be placed between the valve stem 32 and the inside diameter of the upper magnets 48, thereby isolating the upper magnets from direct contact with the hard surface of the valve stem. Additionally, a collar 49 may protect the outside surfaces of the magnets 46, 48.

The lower portion of the valve stem 32 that is located within the bore 30 of the valve housing 20 during operation defines a circumferential groove 56 adapted to secure the O-ring 58 (such as a size 006 50 durometer O-ring with a high lubricity coating and/or a high lubricity Buna formulation). In one example, the groove has a width of about 0.075" and a diameter of about 0.132" to about 0.135" with a tolerance of +/−0.0005 inches. The O-ring 58 is positioned along the lower portion of the valve stem 32, above a bottom face 59 of the valve stem 32, so that the O-ring 58 is located below the outlet ports 22 when the valve stem 32 is in the closed position. The O-ring 58 spans the gap between the outside diameter of the valve stem 32 and the inside diameter of the bore 30 the portion of the bore above the O-ring 58 from fluid located below the O-ring, i.e., the fluid in the reservoir 12, and to thereby prevent fluid from flowing through the valve 10 until the A≧R. Since the O-ring 58 slides in the bore 30 with the valve stem 32, a lubricant such as SuperLube™ by Synco Chemical Corp., may be applied to the O-ring 58 to facilitate smooth movement in the bore 30 and to help break in the O-ring 58. Generally, the sealed or closed position of the valve 10 (wherein water is not flowing through the outlet ports) is maintained while the retention force exceeds the pressure in the reservoir. FIG. 2 shows the valve 10 in the closed position, and FIG. 3 shows the valve in the open position.

In the closed position, the magnetic force between the upper magnets 48 and the lower magnets 46 provides the retention force (R) holding the valve stem 32 down in the closed position. The retention force may be adjusted by adding or removing magnets 46, 48, and changing the separation between the upper and lower magnets 48 and 46. The retention force may also be adjusted by utilizing magnets with various holding forces. In addition, the retention force may be adjusted by adding or removing counterweights 60 located above the upper magnets 48.

In the first embodiment, the lower magnets 46 coupled to the valve housing 20 and the upper magnets 48 coupled to the valve stem 32 are separated in the closed position by the flexible, resilient, and water resistant separator or bumpers 54, which are rubber or synthetic washer, in one example. Separation of the magnets 46, 48 allows much stronger magnets to be used than would be used in an embodiment without a separator. Hence, the magnetic force, or retention force, between the magnets is strong despite the separation of the magnets. By providing a strong magnetic coupling between the upper 48 and lower 46 magnets, the valve stem 32 accelerates, or "snaps" upwardly into the open position (FIG. 3) and also accelerates downwardly into the closed position after fluid pulses from the reservoir 12 as discussed in more detail below.

Resting upon the upper magnets 48, in one example, are one or more cylindrical counterweights 60. The counterweights 60 define an aperture that is aligned with the apertures in the upper magnet 48, and have the upper portion of the valve stem 32 passing therethrough. In one example, a rubber or synthetic washer (not shown) is placed between upper magnets 48 and the counterweight 60 to reduce the likelihood of damage to the upper magnets 48. The counterweights 60 may be used to add our additional gravitational component to the retention force R and to the return force (discussed below).

As fluid is introduced into the reservoir 12 through the inlet valve 45, pressure in the reservoir 12 increases. The pressure increases because the lower portion of the valve stem 32 along with the O-ring 58 prevents fluid from flowing into the valve 10, i.e., through the outlet portion 40 of the reservoir, through the inlet portion 42 of the bore 30, and out of the outlets 22. The valve stem 32 is held, against the pressure in the reservoir 12, in the sealed position by the retention force (R). As pressure increases in the reservoir 12 the upward activation force (A) on the bottom face of the valve stem 32 increases. When the pressure in the reservoir 12 causes the activation force (A) to meet or exceed the retention force (R), the valve stem 32 moves upwardly in the bore 30 in a snap action. The snap action is a function of the activation force (A) overcoming the retention force (R) and the valve stem 32 accelerating upwardly. As the valve stem 32 moves upward, the magnetic face component reduces significantly allowing the valve stem 32 to accelerate upwardly, which facilitates the fluid flow through the valve in a pulse. As the valve stem 32 moves upwardly in the barrel the O-ring 58 moves above the outlet ports 22. After the O-ring 58 moves above the outlet ports 22, the liquid pulses from the reservoir 12 and through the outlet ports 22, into the liquid distribution channel 34, and out a sprinkler head 36. The liquid release through the outlet ports 22 reduces the pressure in the reservoir 12 and hence reduces the force on the bottom of the valve stem 32.

The movement from the sealed position, with the O-ring 58 below the outlet ports 22, to the release or open position, with the O-ring 58 above the outlet ports 22, is the "stroke" of the valve stem 32. In a lower portion of the stroke the O-ring 58 is below the outlet ports 22 and hence seals or closes the reservoir 12 from releasing liquid through the outlet ports 22. In an upper portion of the stroke, the O-ring 58 is above the outlet ports 22 and hence unseals or opens the reservoir 12 and allows liquid to pulse through the outlet ports 22. In the lower portion of the stroke, the valve stem 32 is held in place by the retention force (R). When the activation force (A) on the bottom of the valve stem 32 exceeds the retention force, the valve stem 32 snaps upwardly in the barrel 30. As the valve stem 32 moves upwardly along the stroke toward the upper portion of the stroke, the force between the magnets 46, 48 decreases allowing the O-ring 58 to accelerate past the outlet ports 22. The valve stem 32 is kept from exiting the barrel along the upward stroke, in one example, by a retention strap 62, such as polypropylene webbing, nylon, or the like, which is configured to control the stroke of the valve stem 32 between about 1½ inches and about 2½ inches. In one example, the strap has a width of about ⅝ inches, and a section of vinyl tubing with a ⅝ inch O.D. and a ½ inch I.D, provides a protective sleeve 66 to protect the strap from the impart with the upper magnets. Note, the movement of the valve stem 32 upwardly in response to the force on the bottom of the valve stem 32 may not require the retention strap 62 if the return force is great enough to prevent the valve stem 32 from exiting the bore 30.

When the valve stem 32 is in the upper portion of the stroke, the magnetic force between the upper 48 and lower 46 magnets, along with the gravitational force from the counterweight 60 provides a return force (RF), which is generally less than the retention force (R). After the pressure in the reservoir 12 decreases to a level equal to or less than the return force (RF) the valve stem 32 begins to moves downwardly in the bore 30. The return force (RF) represents the force between the upper 48 and lower 46 magnets and the gravitational force in all positions of the valve stem 32 except in the closed position, which is the retention force (R). As the valve stem 32 moves downwardly and the separation between the upper 48 and lower 46 magnets decreases the return force (RF) increases causing the valve stem 32 to accelerate downwardly. This downward acceleration helps reseal and close valve 10 by accelerating the O-ring 58 downwardly past the outlet ports 22 into the closed position. After the reservoir 12 is closed off, the pressure in the reservoir 12 begins to increase again and the fluid distribution cycle is repeated. Accordingly, the valve 10 periodically pulses fluid out of the outlet ports 22 as long as fluid is supplied to the reservoir 12 in such a manner as to cause the activation force (A) on the bottom of the valve stem 22 to once again exceed the retention force (R).

In the uppermost portion of the stroke the return force (RF) is less than in the retention force (R) in the lower most portion of the stroke. The counterweight 60 is utilized in the upper most portion of the stroke to ensure that the force of the liquid on the bottom of the valve stem 32 is overcome to return the valve stem 32 to the closed position. The counterweight 60 providing downward force on the valve stem 32 through gravity alone, may be necessary when the magnetic force is insufficient to ensure that the valve stem 32 reseals the reservoir 12. In addition, although not necessary to reseal the reservoir 12, the counterweight 60 may also provide a quicker stroke than an embodiment without a counterweight by assisting the magnetic force in rapidly overcoming the force on the bottom of the valve stem 32 as liquid flows out of the outlet ports 22.

As discussed above, the O-ring 58 may be lubricated using any commonly available water resistant lubricant to facilitate smooth movement of the valve stem 32 in the bore 30. The use of a lubricant is especially important in low pressure applications wherein the pressure in the reservoir 12 and the retention force (R) are adjusted in such a manner as to allow low pressure liquid releases through the outlet ports 22.

The retention (R) and return forces (RF) are primarily the sum of two individual force components: the magnetic force acting between the upper 48 and lower 46 magnets; and the gravitational force acting on the valve stem 32, the upper magnets 48 and the one or more counterweights 60. The strength of the attractive magnetic force is a function of the distance between the magnets 46, 48 with the force decreasing asymptotically as the distance is increased. In one example, the upper 48 and lower 46 ceramic magnets have a combined attractive force of about 48 pounds when in direct contact with each other, but have an attractive force of only about 4–5 ounces when separated by the ¼ inch bumper 54. Increasing or decreasing the height of the bumper stack 54 can adjust this component of the retention force (R). As the distance increases between the upper 48 and lower 46 magnets, the magnetic force component of the retention force (R) quickly drops to negligible levels.

The gravitational force component of the retention (R) and return forces (RF) is directly related to the weight of the valve stem 32 and the weight of the components connected to the valve rod, such as the upper magnets 48 and the counterweight 60. The gravitational force is constant and does not vary with the position of the valve stem 32 relative to the valve housing 20. This component of the retention (R) and return forces (RF) encourages the valve stem 32 to move back into the closed position once the water pressure and consequently the activation (A) force drops. It can be appreciated that in order for the valve 10 to function properly, the valve stem 32 and the bore 30 must be at least partially vertically orientated with the top of the valve stem 32 disposed above the rest of the valve 10. As the angle of the valve stem 32 deviates from vertical, the amount of gravitational force applied to push the valve stem 32 will be reduced accordingly, potentially effecting the operation of the valve 10. Adjustments can be made, however, to facilitate operation on sloped surfaces by adding or removing counterweights 60 as necessary, changing the magnetic component force retention(R) and return forces (RF), and the like.

There are several additional components of the retention force (R) that may affect the level of the activation force (A) necessary to move the valve stem 32 into its open position. For instance, there is a static friction force associated with the static coefficient of friction of the O-ring 58 within the bore 30 that decreases to zero once the O-ring 58 begins to slide. There is also a dynamic friction force (typically much less than the static friction force) associated with a dynamic coefficient of friction that acts while the O-ring 58 slides along the surface of the bore 30. In the first embodiment, these additional force components do not significantly affect the operation of the valve 10 but depending on the design of alternative valve assemblies, they can be significant.

Retention force components derived by other means may also be utilized in alternative embodiments of the present invention, so long as (i) the force as a whole is reduced significantly once the valve is opened to allow fluid to freely flow through the valve and (ii) only fraction of the full retention force (the return force) is necessary to close the valve 10. For example, soft deformable O-ring may be utilized in place of the upper and lower magnets, wherein the soft O-ring deforms as the pressurized fluid from the reservoir 12 presses it against the wall of the bore 30. Because of the deformation of the O-ring, a high activation force (A) is necessary to break the frictional engagement of the O-ring 58 with the wall. However, once this static friction has been overcome the amount of force necessary to push the valve stem 32 upwardly and hold it in its open position is reduced to a level primarily dependent on the gravitational force applied to the valve stem 32 based on the weight of the valve stem 32 and any counterweights 60 attached thereto. Once the pressure in the reservoir 12 has dropped to a low enough level, the gravitational force will cause the valve stem 32 and the then undeformed soft O-ring to move downwardly into its closed position. It is also contemplated that a spring member coupled between the valve housing 10 and the upper portion of the valve stem 32 may be used along with the magnets, and counterweights, or replace them in alternative embodiments of the present invention.

Figure 7:
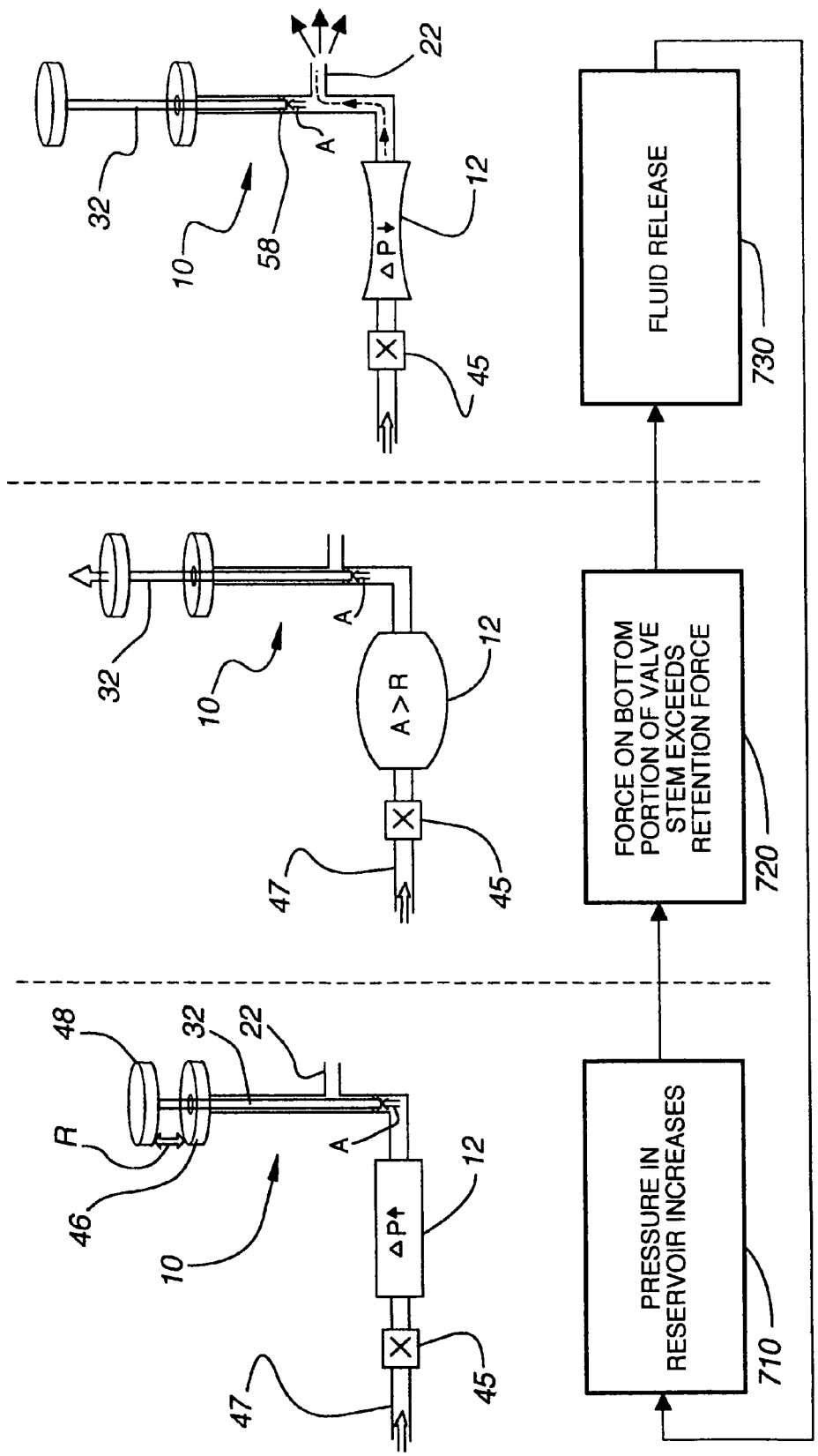
FIG. 7 is a block diagram illustrating the operation of the valve according to the present invention, in one example.

FIG. 7 is a block diagram illustrating the operation of the valve 10 according to one embodiment. The operations 710–730 are discussed with reference to the first embodiment (FIGS. 1–6), however, the operations are generally applicable to the other embodiments of the invention illustrated and discussed herein. In the first operation 710, fluid flows into the reservoir 12 to increase pressure in the reservoir. The pressure builds in the reservoir causing the force (A) on the bottom of the valve stem 32 to increase. In the second operation 720, the activation force A on the bottom of the valve stem 32 exceeds the retention force (R) causing the valve stem 32 to begin moving upward in the bore 30. In the third operation 730, the O-ring 58 moves above the outlet port 22 allowing fluid to flow from the reservoir 12 into the valve 10 and through the outlet ports 22. In the third operation 730, the pressure in the reservoir decreases due to the release of fluid from the reservoir 12.

It can be appreciated that in alternative embodiments either the upper 48 or lower 46 magnets may be replaced with a ferric attractor. For example, the counterweight 60 and the upper ceramic magnets 48 can be replaced with a single cylindrical shaped piece of ferritic stainless steel which will be attracted to the lower magnet 46 and will perform the counterweight function. Depending on the configuration of the valve 10, the strength of the lower magnets 46 may need to be increased and/or the distance between the lower magnets and the stainless steel attractor decreased to provide an attractive magnetic force comparable to a valve 10 having both upper 48 and lower 46 magnets.

FIGS. 8–12 illustrate a second embodiment of the present invention. In general, the second embodiment is similar to the first embodiment. The valve 110 utilizes the same type of reservoir 112 and regulator 45 as described for the first embodiment. Like the first embodiment, the valve 110 incorporates a housing 120 defining a bore 130 extending longitudinally through it with the lower end of the bore 130 in fluid communication with the reservoir 112, and at least one outlet port 122 extending generally transversely to the bore 130. A liquid distribution channel 134 fluidly connects the outlet port 122 with a sprinkler head 136. A T-fitting 168 having a pressure gauge 170 attached thereto is in fluid communication with the bore 130 between the outlet ports 122 and the reservoir 112. The pressure gauge 170 allows a user to determine the pressure at which the activation force (A) exceeds the retention force (R) for use when adjusting the operational characteristics of the valve 110 by adding or removing counterweights 160 and/or adjusting the strength and/or number of the magnets 146. The feedback from the pressure gauge 170 also helps the operator adjust the flow regulation rate into the reservoir 112. For example, by observing how rapidly the pressure increases, you can easily adjust the flow of fluid into the reservoir 112, such as by adjusting a tap, changing emitters, or modifying the volume of the reservoir 112, to get the desired intermittent frequency rate for the valve 110. The T-fitting 168 is connected with the valve housing 120. The T-fitting 168 defines a second bore 131 in alignment with the bore 130 of the valve housing 120. In one example, an intermediate fitting 133, defining a third bore 135, couples the valve housing 120 to the T-fitting 168. It is envisioned that the gauge 170 could be used and fitted with the other embodiments discussed herein in substantially the same manner as discussed above. It is envisioned that the gauge 170 may be connected with the valve housing 120 in other configurations. For example, the gauge 170 can be directly connected with the valve housing 120 via a threaded aperture, and one or more of the intermediate fittings may be eliminated or arranged differently. The lower portion of the T-fitting 168 is directly connected with a second base 137, or, in one example, via an additional fitting 148.

Figure 8:
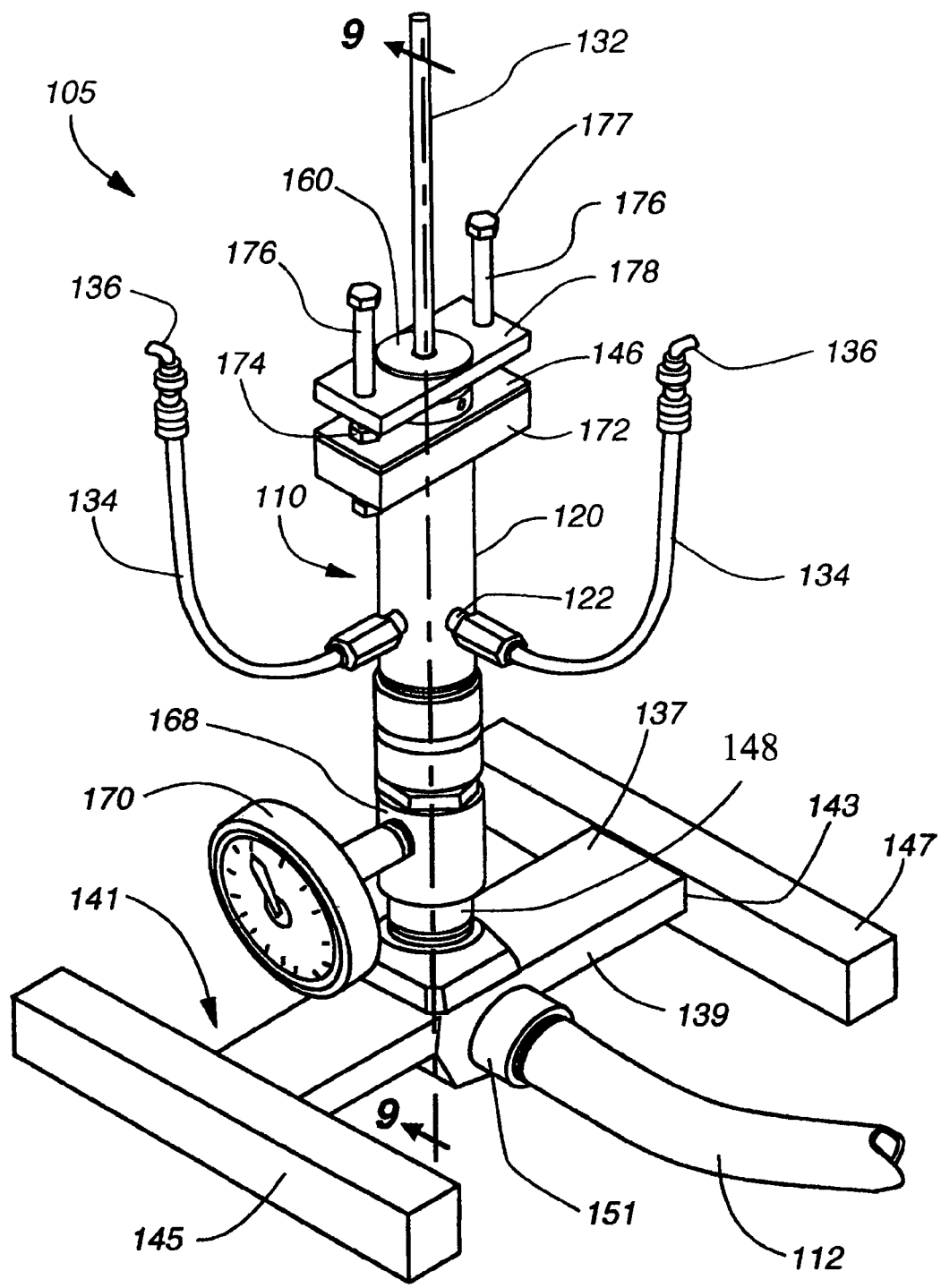
FIG. 8 is an isometric view of a second embodiment of the present invention.

As best illustrated in FIG. 8, the second base 137 includes a cross member 139 having a first end 141 and a second end 143, and having a first support member 145 connected transversely to the first end 141 of the cross member and having a second support member 147 connected transversely to the second end 143 of the cross member. The second base 137 defines a generally H-shaped structure. The additional intermediate fitting 148 defines two threaded male ends and defines a fourth bore 150, and is fluidly coupled at its lower end to a fluid channel 149 defined by the cross member 139, the fluid coupling being about midway between the first support member 145 and the second support member 147. In this embodiment, the fluid channel 149 is L-shaped (not shown) with the vertical section of the L defining and opening at the top of the support member 145, and the transverse lower section of the L defining an opening in the front face of the support member 147. A female fitting 151 adapted to receive and connect the reservoir 112 is connected to the front face of the cross member adjacent the L-shaped channel, and in fluid communication with the fluid channel 149. Accordingly, in this embodiment, fluid flows between the reservoir 112 and the valve 110 through the fluid channel 149 defined by the second base 137. This base 137 may be readily exchanged with the base 14 described with reference to the first embodiment, and the reservoir 112 fluidly connected with the inlet of the valve 110.

The valve stem 132 is also similar to the valve stem 32 one described in the first embodiment incorporating a lower portion that is slidably contained within the bore 130 for movement between open and closed positions, and an upper portion that has counterweights 160 attached thereto, in one example.

Figures 9, 10:
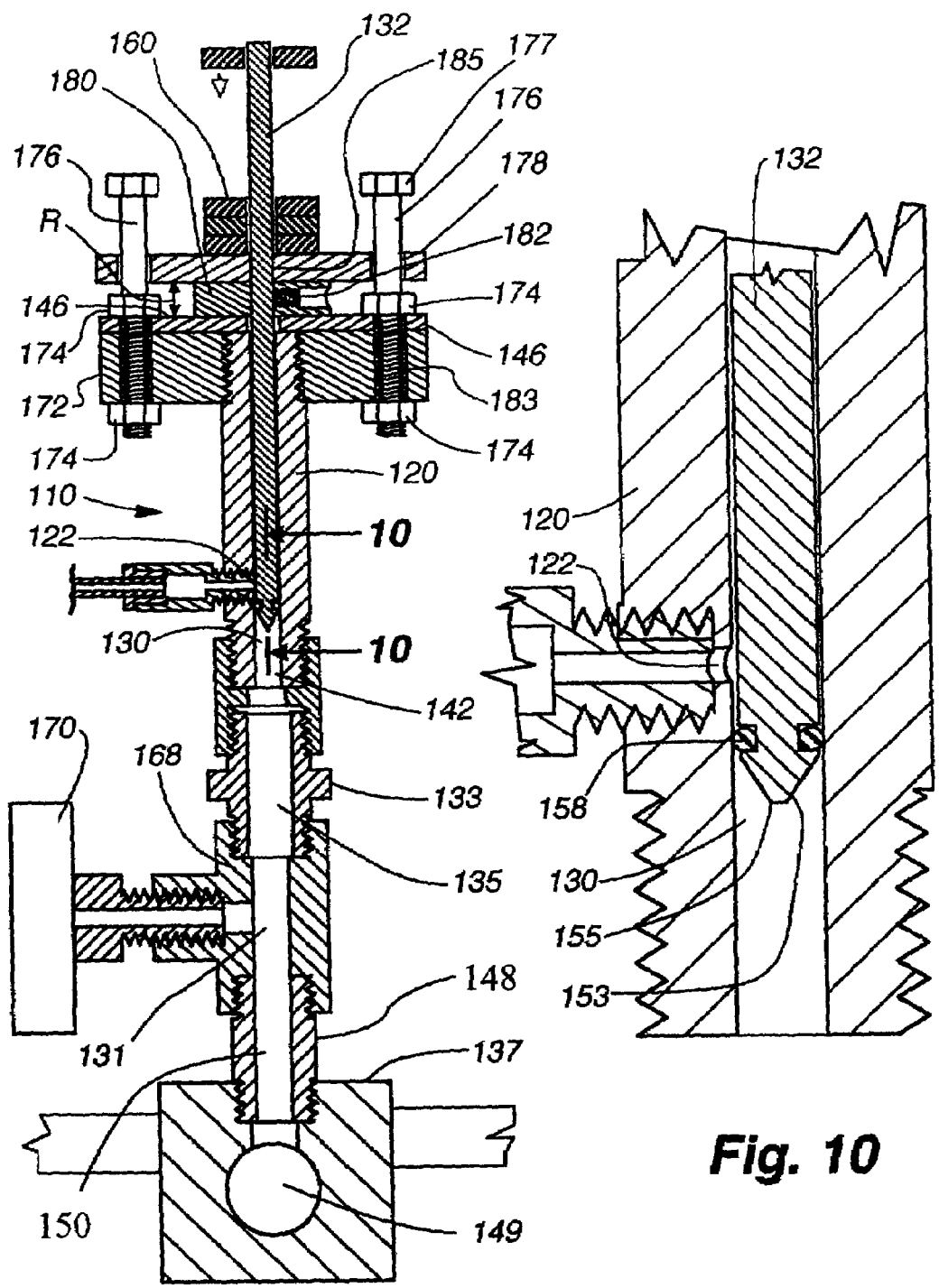
FIG. 9 is a partial section view of the second embodiment taken along line 9—9 of FIG. 8 showing the valve in its closed position.
FIG. 10 is a partial section view of the second embodiment taken along line 10—10 of FIG. 9, and illustrating an O-ring circumscribing the bottom portion of a valve stem, the O-ring being below an outlet port of the valve.

The second embodiment, unlike the first embodiment, uses a weaker magnet 146 that engages one or more metallic components connected with the valve stem 132 to provide the retention force. The magnet 146 is attached to a magnet platform 172 that is threadably attached to the top of the valve housing 120, in one example. As shown in FIGS. 8 and 9, the magnet 146 is held on the magnet platform 172 by nuts 174 and two retaining bolts 176, in one example. An upper portion of the shaft of each retention bolt 176 extends upwardly from the magnet platform 172 until terminating at a bolt retaining head 177. In this embodiment, the distance between the top nut 174 and the bolt head 177 deliver the stroke of the valve stem 132. A corresponding counterweight platform 178 is attached to the valve stem 132 above the magnet platform 172 by way of a metallic collar 180 that is secured to the valve stem 132 with a setscrew 182. As can be best seen in FIGS. 9–11, the counterweight platform 178 is rectangular and has a pair of holes through which the upper portions of the bolt shafts pass. Additionally, a center hole 185 permits a portion of the upper section of the valve stem 132 to pass through the counterweight platform 178. The counterweight platform 178 provides a platform for holding the counterweights 160, and serves as a stop for preventing the valve stem 132 from exiting the bore hole 130 by impacting the heads 177 of the aforementioned retaining bolts 176. The metallic collar 180, which is attached to the valve stem below the platform 178, serves as an attractor for the magnet 146, in one example.

FIG. 9 is a section view of the second embodiment taken along line 9—9 of FIG. 8, and illustrating the second embodiment in the sealed or closed position. The magnetic force used in the second embodiment is less than the magnetic force used in the first embodiment because the magnet 146 actually engages the collar 180, which is connected with the valve stem 132. With the magnet 146 and collar 180 in engagement, the magnetic force therebetween is maximized. Accordingly, a higher strength magnet would have a higher retention force than the magnet 146, and accordingly require a higher activation force (A) to overcome the retention force (R); and accordingly, provide a higher pressure and higher volume burst of fluid from the valve 110.

FIG. 10 is a section view taken along line 10—10 of FIG. 9. The bottom portion of the valve stem 132 as shown in FIG. 10 has a substantially pointed bottom 153 having a flat tip 155. The valve stem 32 illustrated in the first embodiment, in contrast, has a substantially flat bottom having rounded edges and a 0.020 inch width. The valve stem 132 in each embodiment operates similarly. The pointed bottom valve stem has a somewhat lower likelihood of binding with the edges of the bore 130, when the valve stem 132 is moving between the open position and the closed position. In addition, the force distribution of pressurized fluid from the reservoir 112 along the pointed bottom is somewhat different than the force distribution on the flat bottom. However, the net effect of the different force distributions is substantially similar resulting in little net difference, if any, in the force acting on the bottom of the valve stem.

Figures 11, 12:
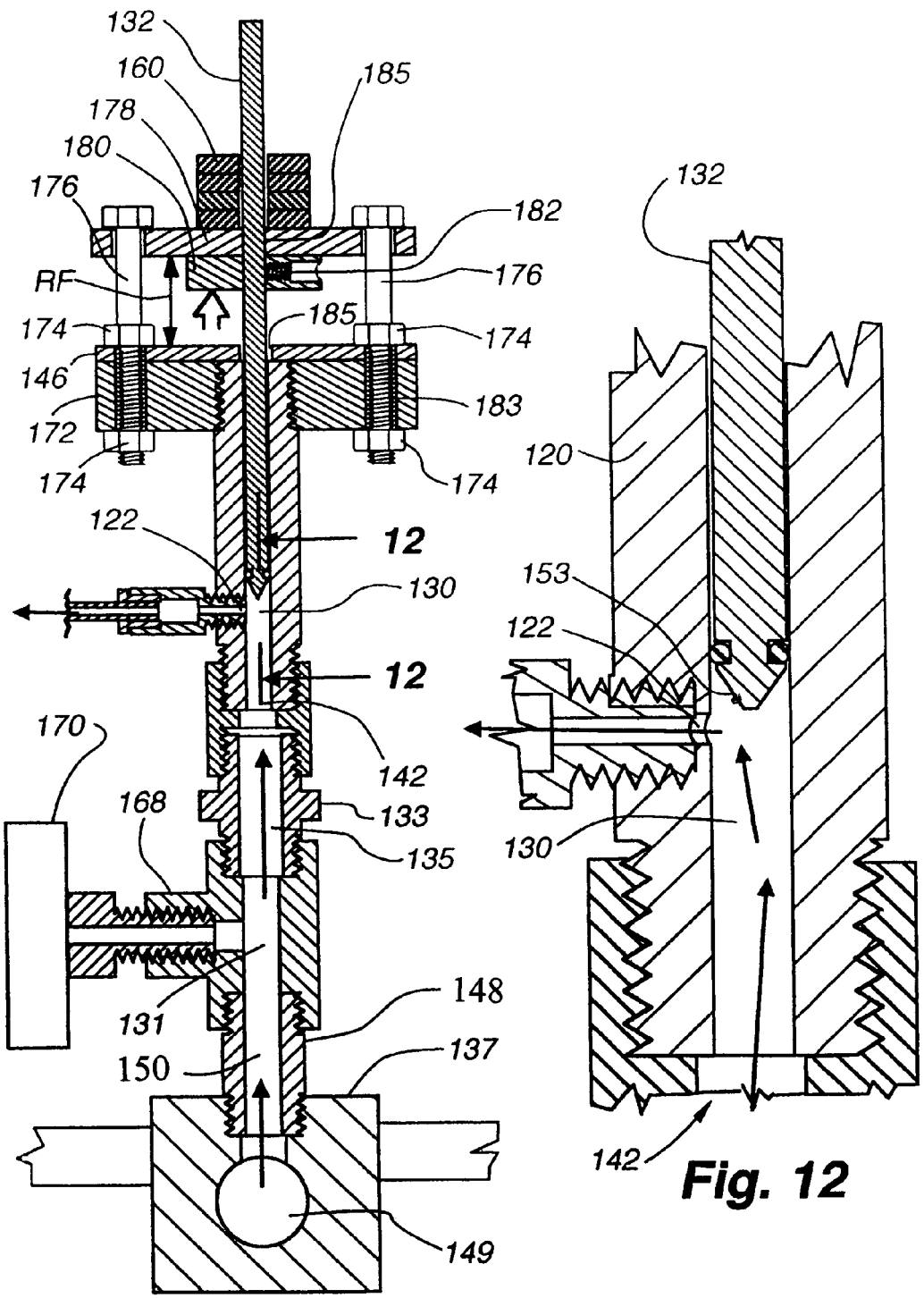
FIG. 11 is a section view similar to FIG. 9 wherein the valve is in the open position.
FIG. 12 is a partial section view of the second embodiment taken along line 12—12 of FIG. 11, and illustrating the O-ring above the outlet port so that fluid pulses up into the valve and out of the outlet port.

FIG. 11 is a section view taken along line 9—9 of FIG. 8 illustrating the second embodiment of the valve in the open position. As with the first embodiment, as pressure increases in the reservoir 112 the force from the fluid on the bottom portion 153 of the valve stem 132 exceeds the retention force (R) and the valve stem 132 moves upwardly in the bore 130 until the O-ring 158 is above the outlet port 122. When the O-ring 158 is above the outlet port 122 the fluid pulses from the reservoir 112 through the inlet portion 142 of the bore 130, and through the outlet port 122. When the fluid flows through the outlet port 122, the pressure in the reservoir 112 decreases until the force on the bottom of the valve stem 132 is less than the return force (RF) allowing the valve stem to move back to the closed position as shown in FIGS. 9 and 10.

By using a lower power magnet 146 than the first embodiment, and using counterweights 160 (in some instances more than the first embodiment), the retention force (R) and the return force (RF) are somewhat modified, and hence the operation of the valve 110 is somewhat different. In this embodiment, the magnetic force field drops dramatically once contact is broken. Whereas, in the separated magnet embodiments, such as is illustrated in FIGS. 1–6 and 13–16 have a much greater effective magnetic reach, and the force therebetween decreases more gradually as the valve stem moves from the closed to open position, and conversely increases more rapidly when the valve stem comes back down again to the closed position at the end of each cycle. For the retention force (R), the use of the low power magnet 146 serves to prevent the valve stem 132 from bobbing in response to the activation force (A) from the reservoir 112, and accordingly facilitates a snap-action for the valve 110 generally. The majority of the retention force (R), however, is provided by the counterweights 160.

When the valve activates and the valve stem 132 snaps upwardly, the movement tends to be more linear than with the first embodiment because the primarily force component is provided by the counterweights 160 rather than the magnet 146. The initial uplifting impulse provided by the contact magnet 146, however, is greater than with the non-contact configuration, e.g., FIG. 1, because the retention force (R) of the contact magnet 146 effectively drops to zero almost immediately once the contact is broken. The valve stem 132 gets a more powerful initial boost this way. In the other embodiments, with the non-contact powerful magnets, the retention force (R) drops off more gradually. The initial boost is not as great. The advantage from the non-contact type magnets, however, is when the top magnets come back down again during the closing phase of the cycle. The magnetic attractive force progressively increases as the non-contacting magnets get closer. In the contact magnet configuration the magnet has little effect on the closure operation until full contact is made. The acceleration of this movement is fairly linear because the low power magnet provides little added acceleration back into the closed position, as with the first embodiment. It is envisioned that the various features of the valve of the second embodiment, such as the low power magnet, the counterweights, etc., are fully interchangeable with the various like features of the first embodiment and other embodiments disclosed herein.

Otherwise, the general principles discussed with reference to the first embodiment are applicable to the second embodiment. For example, the valve stem 132 moves upwardly into the open position allowing the fluid to pulse from the reservoir 112 into the valve when the activation force (A) from the fluid in the reservoir exceeds the retention force (R). And, the valve stem 132 moves from the open position back to the closed position when the return force (RF) exceeds the remaining activation force from the fluid in the reservoir 112.

In a third embodiment, not illustrated herein, no magnets are used for the retention force. Instead, only counterweights are used to create the retention force. This embodiment simplifies the operation of the valve to some extent by removing the magnetic component of the retention and return forces. This embodiment is especially useful if it is desirable to have the valve bob up-and-down in small increments, and allow only small fairly low volume and low pressure bursts of fluid. This occurs primarily because the non-linear force component provided by the magnet, as found in the first two embodiments, is not present in the third embodiment. In addition, the use of soft O-rings can provide a high initial static friction, which facilitate the "snap action" effect to pop the valve stem up.

Figure 13:
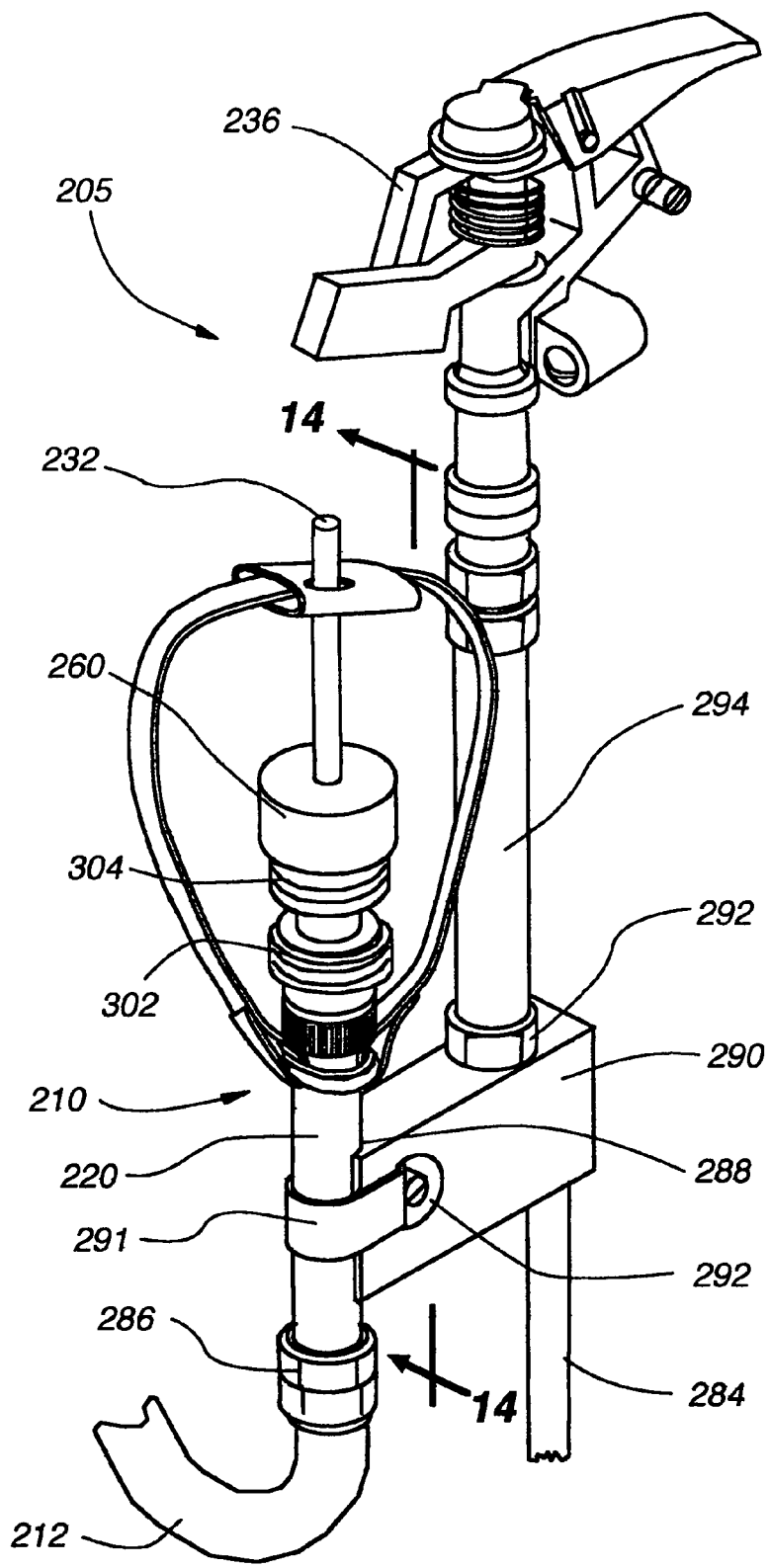
FIG. 13 is an isometric view of an embodiment of the present invention adapted for high volume fluid dispersal.
Figure 14:
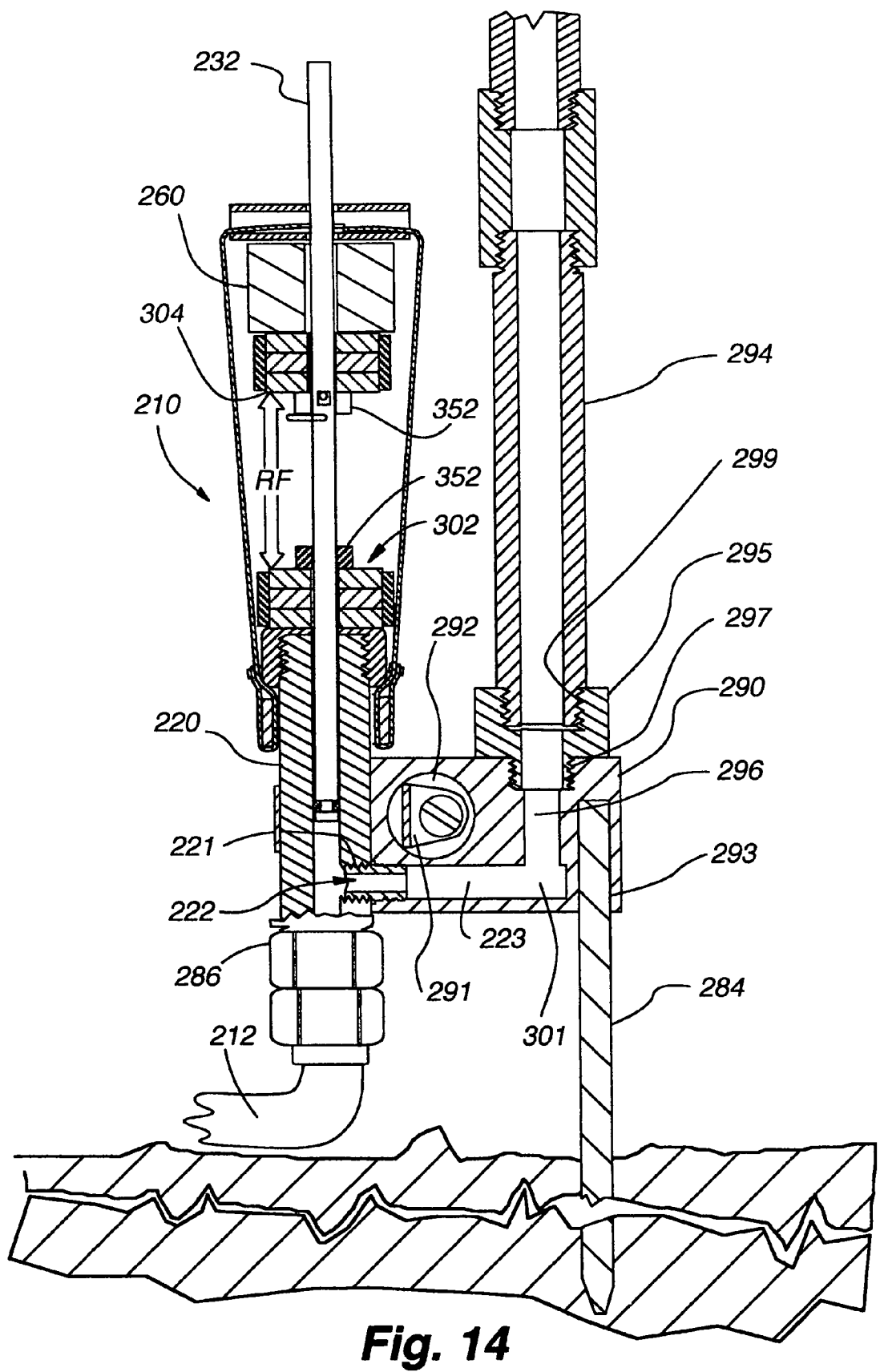
FIG. 14 is a cross section view of the embodiment illustrated in FIG. 13 taken along line 14—14 of FIG. 13, and showing the valve in the open position.

A fourth embodiment of the present invention is illustrated in FIGS. 13 and 14. FIG. 13 shows an isometric view of the fourth embodiment of the sprinkler system 205 including an impulse-type sprinkler head 236, such as those which are commonly available and well known to those skilled in the art. FIG. 14 is a partial section view of the third embodiment illustrating the valve 210 is similar in configuration and operation to the valve 10 described in regard to the first embodiment. It is also envisioned that the second and third embodiments of the invention as described herein may also be used with a sprinkler head 236 and the related attachment structure described below. The valve 210 as best shown in FIG. 14 has a single outlet port 222 as opposed to two outlet ports illustrated for the first and second embodiments. The fourth embodiment also differs from the first embodiment in the manner in which the valve 210 is incorporated into a sprinkler system 205. The fourth embodiment is adapted for use with a standard size sprinkler head, such as the impulse-type head 236 shown, that are commonly available; whereas, the first and second embodiments are illustrated with smaller sprinkler heads (36, 136), such as the type used in low volume irrigation applications. The use of a larger sprinkler head (236) permits the sprinkler system 205 to provide coverage to a greater area and to expel a greater volume of fluid in a shorter amount of time. The fourth embodiment also incorporates a stake 284 in place of the base (14, 137) to secure it into the ground. These differences and others, along with the other components of the fourth embodiment are discussed in further detail hereafter.

Referring to FIG. 14, a female/female swivel coupling 286, in one example, is threadably attached to the bottom end 286 of the valve housing 220; thereby facilitating easy disconnection of a male connection associated with the reservoir 212 from the valve 210 without stripping the soft threads of the plastic valve housing 220. In another example, a quick connect coupling is threadably attached to the bottom end of the valve housing 220, which facilitates the connection and disconnection from the reservoir 212, and reduces the likelihood of leaking. The convex side of the valve housing 220 is cradled in a vertical and concave side 288 of a support block 290. The support block 290 has a hole 292 passing horizontally through it proximate the concave side, wherein a clamp 291, such as a stainless steel hose clamp, passes through the hole 292 and around the valve housing 220 to secure the support block 290 thereto. In one example, the support block 290 is fabricated from a polymeric material such as polyethylene, although other types of materials can be used. The steel stake 284 extends downwardly from a hole 293 in the bottom surface of the support block 290, and is staked into the ground to secure the sprinkler 205 in a generally vertical orientation.

The male end of a male/female fitting 295 is threadably received into an opening 297 along the top surface of the support block 290. A vertical riser tube 294 is threaded into a threaded female portion 299 of the fitting 292 wherein the top of the riser 294 is configured to have any one of a number of standard sprinkler heads, such as sprinkler head 236. Fitting 295 may be eliminated if the vertical riser tube 294 is threadably compatible with the threads of the opening 297 (FIG. 14). The riser tube 294 is then directly received into opening 297.

Referring to FIG. 14, a barbed threaded fitting 221 is received in the outlet port 222 of the valve 210. The other end of the fitting 221 is press-fit into a horizontal bore 223 defining a liquid distribution channel 301 that extends horizontally and vertically through the support block 290 as best shown in FIG. 14. In one example, the channel 301 has a diameter of about ½ inch and the outlet port 222 has a diameter of about ⅜ inch. The fitting 221 is press-fit in the outlet port 222, and the horizontal channel 223 is press-fit over the fitting 221. Intersecting the horizontal bore 223 is a vertical bore 296 that defines an opening along the top surface of the support block 290. Accordingly, when the valve 210 is in its open position, the reservoir 212 is in fluid communication with the sprinkler head 236 via the liquid distribution channel 301 as shown in FIG. 14. The liquid distribution channel has a larger diameter than other embodiments discussed herein, such as about ½ inch that acts to reduce the frictional energy losses from fluid flow through the channel 301 and increases intermittent flux and power, which facilitate the use of larger sprinkler heads, such as sprinkler 236.

In this embodiment (similar to the first embodiment), the retention force (R) and the return force (RF) are provided primarily by three lower ceramic ring magnets 302 connected with the top of the valve housing 220, three upper ceramic ring magnets 304 connected with the valve stem 232, and a counterweight 260 coupled with the valve stem 232. The upper magnets 304 are separated from the lower magnets 302 by one or more bumpers 352.

Figure 15:
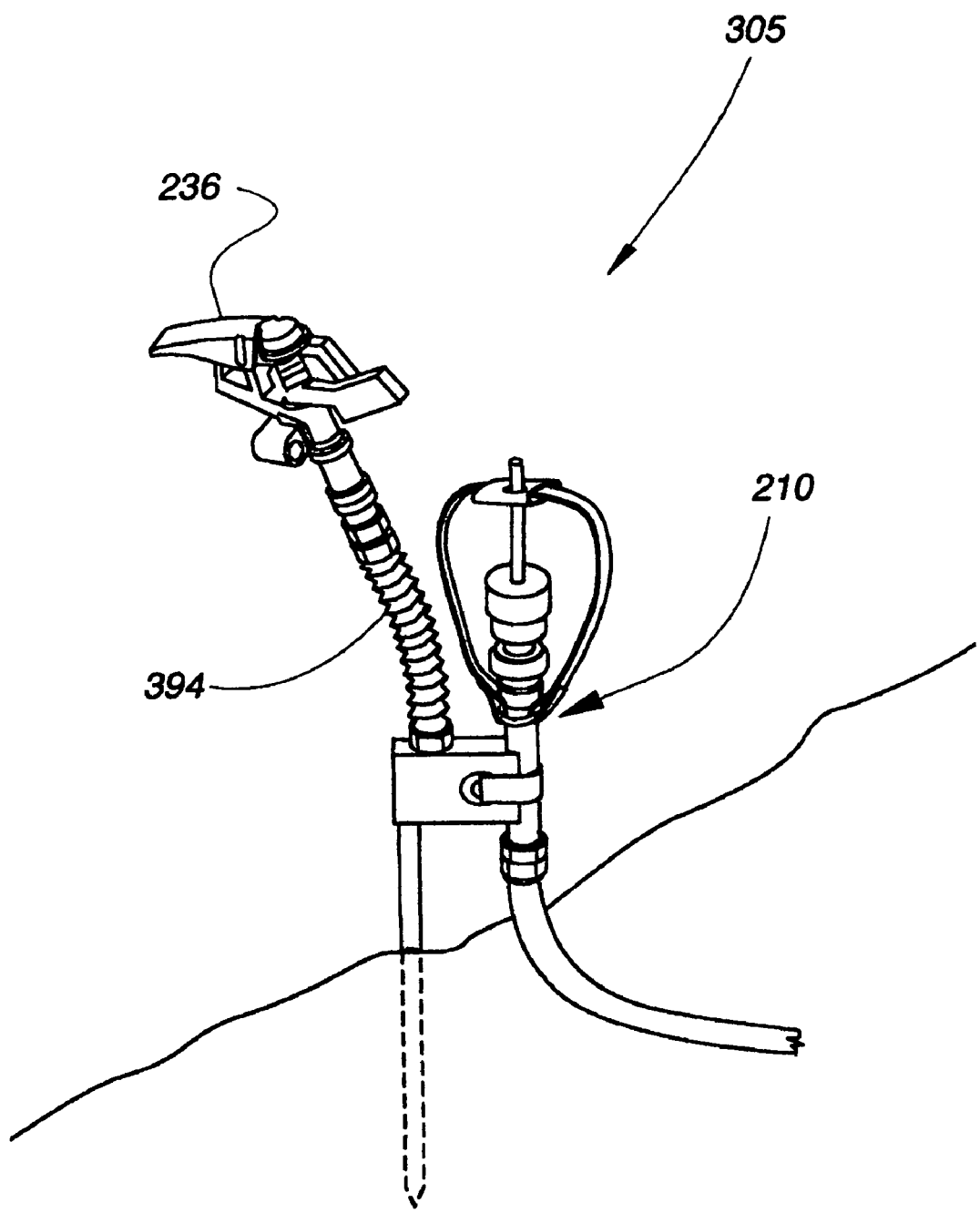

A fifth embodiment of the present invention is illustrated in FIG. 15, which is similar to the fourth embodiment except that the riser tube 294 has been replaced with a section of ball-socket type tubing 394, wherein the angle of the sprinkler head 236 can be varied to closely match the topography of the underlying ground, such as being oriented transversely to the ground, while maintaining the valve 210 in a generally vertical orientation. Other types of flexible tubing can be used in place of ball-socket tubing provided the tubing has sufficient rigidity to withstand the thrust incident on it from water exiting the sprinkler head 236. For instance, a flexible interlocking metal hose with a plastic liner can be used in place of the ball-socket tubing.

Figure 16:
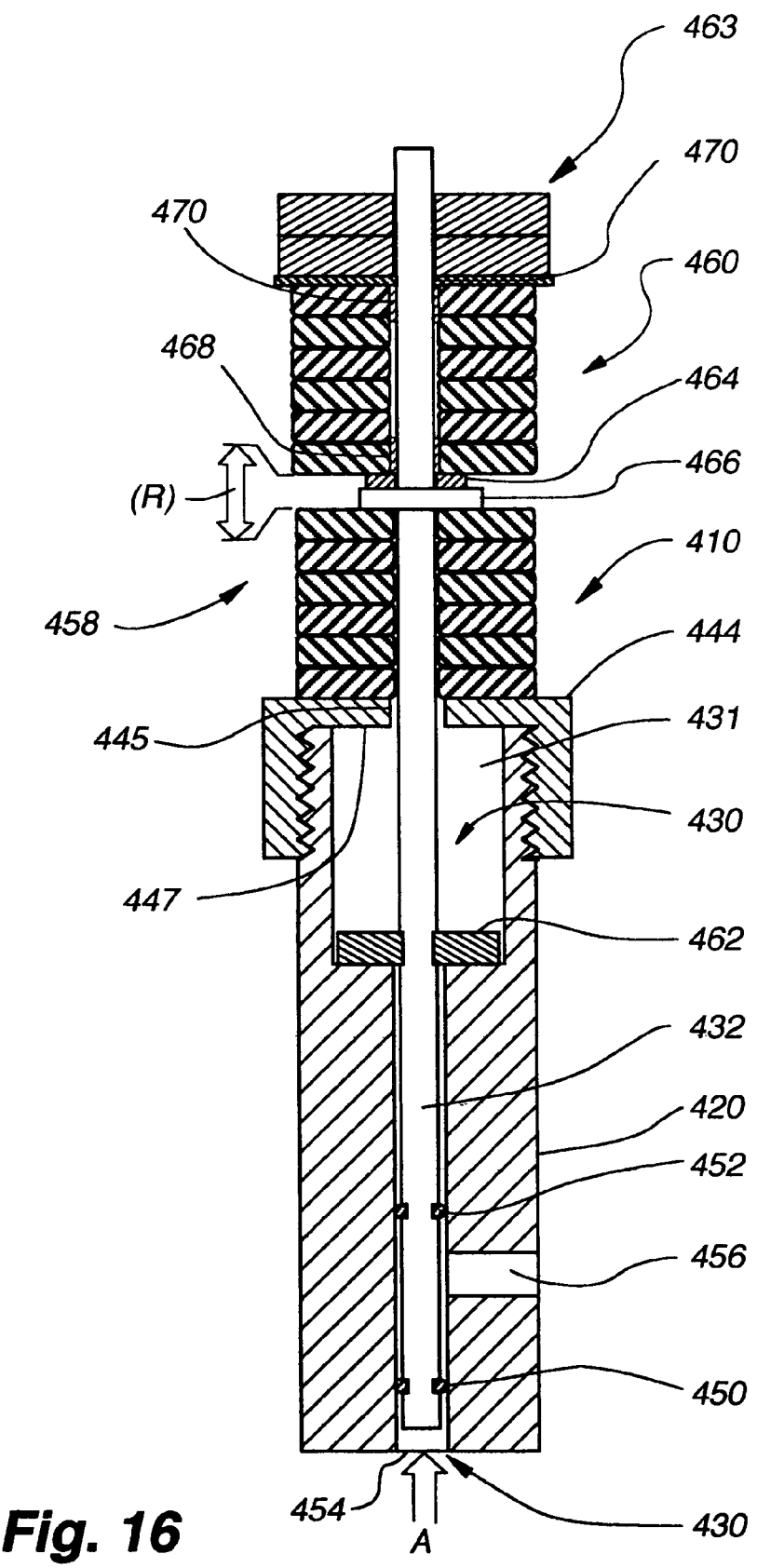
FIG. 16 is a vertical cross section view of a valve according to another embodiment of the present invention, this embodiment includes a second O-ring and internal valve stem stroke control.

A valve 410 incorporating an internal valve stem 432 stop in lieu of the retention strap 62 of the preceding embodiments is illustrated in FIG. 16. The longitudinal bore 430 of the valve housing 420 defines an enlarged section 431 proximate the upper portion of the valve housing 420, the enlarged section 431 has a diameter greater than that of the valve stem 432 and greater than the diameter of the lower portion of the bore. The stop member 462 has a diameter less than that of the enlarged section 431 of the bore 430 and is placed over the valve stem 432 and secured thereto by any suitable means to prevent the stop 462 from moving from its attachment location relative to the valve stem 432. For instance, the stop member 462 can be swaged in place, or held in place by a hitch pin. In one example, the stop member 462 is a flexible resilient bumper, such as a section of latex tubing, supported on a stainless steel cotter pin, and the cotter pin is connected with the valve stem via a $5/64$ inch aperture in the valve stem 432. A cap 444 defining an aperture 445 to allow the valve stem 432 to slide through it is threadably secured to the top end of the valve housing 420, substantially enclosing the enlarged section 431 of the bore 430. When the activation force (A) exceeds the retention force (R) of the valve 410 during a sprinkler cycle and the valve stem 432 is thrust upwardly, its upward movement is limited by the impact of the stop 462 with an inside surface 447 of the cap 444, with a stroke of about one inch.

The valve stem 432 illustrated in FIG. 16 includes a lower O-ring 450 circumscribing the valve stem 432 and an upper O-ring 452 circumscribing the valve stem 432. The lower O-ring 450 and the valve stem 432 generally operate in substantially the same manner as described above with regard to other embodiments. In one example, the groove that the O-rings 450, 452 fit in has a width of about 0.075 inch and a diameter of about 0.136 inch.

The upper or second O-ring 452 is positioned so as to prevent backflow coming back through the outlet port 456 and up the bore 430 and out the top when the valve is in the closed position. Also, the second O-ring 452 is positioned low enough on the valve stem 432 so as to not enter the enlarged section 431 of the bore 430 at the top of the stroke and so as to provide an added barrier to any incidental leaking up through the bore 430 of the Teflon™ barrel when the valve stem 432 is in the open position.

As illustrated in FIG. 16, six ceramic ring magnets 458 (lower magnets) are connected with the cap 444, and six ceramic ring magnets 460 (upper magnets) along with two counterweights 463 are connected with the upper portion of the valve stem 432 with a hitch pin 464. A bumper 466, such as a section of latex tubing, with a width of about ¼ inch to about $5/16$ inch separates the upper magnets 460 and the lower magnets 458. The force between the six upper and six lower magnets provides a component of the retention force (R) such as about 4 lb. of attractive force and the counterweight 463 add about 1 lb., providing a total (R) of about 5 lb., in one example. Alternatively, one large magnet having a similar magnetic force may be used. An upper latex bushing 470 and a lower latex bushing 468 between the valve stem 432 and the upper magnets 460 are used to reduce wear and tear on the magnets. Additionally, in one example, a rubber washer 470 is placed between the upper magnets 460 and the counterweights 463 to reduce wear and tear on the magnets. The additional upper 460 and lower 458 magnets are useful to provide a higher retention force as compared with, for example, three upper and lower magnets, which allows more pressure and fluid volume to build in the reservoir.

The inlet part 454 is fluidly connected with a reservoir (not shown) holding a fluid, such as water. The fluid flows into the reservoir through a valve, such as an emitter type valve, from a source, such as a tap, and gradually builds up pressure in the reservoir and on the bottom portion of the valve stem 432 and the lower O-ring 450. When the pressure in the reservoir, i.e., the activation force (A), exceeds the retention force (R), the valve stem 432 snaps upwardly in the bore 430. When the lower O-ring 450 moves upwardly past the outlet port 456, the fluid from the reservoir pulses into the inlet port 454 and out the outlet port 456. From the outlet port 456, in one example, the fluid pulses into a distribution channel and into a sprinkler, such as is shown in FIGS. 13 and 14.

Applications Utilizing Embodiments of the Present Invention

Through the periodic release of water from a sprinkler incorporating the periodic valve as described herein, the ground and soil within the range of the sprinkler can be maintained at a generally constant moisture level. This is in contrast to the manner in which other types of automatic sprinkler systems are utilized, wherein the ground is drenched and then allowed to dry to a certain level before more water is applied.

The amount of water released by the sprinkler embodying the characteristics of the present invention depends on the size of the reservoir utilized, the rate at which the reservoir is refilled, the critical pressure necessary to open the periodic valve assembly (when the activation force overcomes the retention force), and the pressure level at which the valve closes (the return force). Each of these parameters is adjustable for specific applications.

Embodiments of the invention are particularly useful in maintaining a moisture level of seeds planted near the surface of the soil, thereby encouraging rapid germination. It can be appreciated that using traditional sprinkling methodology, seeds might dry-up between watering, thereby increasing the time necessary for them to germinate. Seedlings and other new emerging plants are typically very delicate and intolerant of significant variations of moisture levels. In particular, seedlings are prone to shrivel and die within a very short period of time if they cannot get the necessary fluids from the soil. Furthermore, if seedlings with undeveloped root systems are over watered they can wash away because they are not strongly anchored to the ground. The invention can ensure that the necessary amount of water is delivered to the soil at a constant rate, which can also be balanced with the rate of water evaporation to maintain the soil at a moisture level that is preferred by the seeds or seedlings. Furthermore, because the regulator controls the rate of consumption of water (i.e., the rate at which the reservoir fills), the sprinkler can be left on for extend periods of time without worry about excessive and wasteful water consumption, or the need for electrical timing components. Sprinklers incorporating embodiments of the invention can be utilized with adult plants as well, wherein an adult plant need not utilize its resources growing deep root systems to reach moist soil, thereby freeing resources to be utilized growing other portions of the plant, such as foliage and/or harvestable crops. As a further advantage, the moisture levels help promote the growth of aerobic bacteria and fungi which breakdown organic matter into nutrients that are usable by plants.

The frequent and potentially violent release of water a sprinkler incorporating embodiments of the invention is effective deterring various pests such as rats, mice, birds, and rabbits from the area in which the sprinkler is being utilized. In certain instances, the pests may be scared by the noise that accompanies the rapid release of water as the valve stem (32, 132) is thrust upwardly into the retention strap 62, stop member 462, or the like. In other instances, the pests may be deterred by the drenching from the cyclic bursts of water.

In another use unrelated to gardening, the present invention can be utilized in a series to create "wet lines" for use in fighting wild fires. Traditionally, firefighters create "fire lines" around a fire or along one front of a fire to contain it by preventing it from spreading to the other side of the fire line. Depending on the fire and the configuration of the associated land, "fire lines" may be dug into the ground or they may be created by burning or clearing the combustible materials from the ground that will constitute the "fire line." Alternatively, the ground area that is to form a "fire line" may be doused with water to increase the moisture level of the ground and plants to an incombustible level (typically 15% moisture by weight). Although dousing an area with water can be effective, it is often impractical, because of the amount of water necessary (much of the water is absorbed into the ground) and the potential for breaks in the line if the water is not evenly applied along the entire length of the line.

Figure 17:
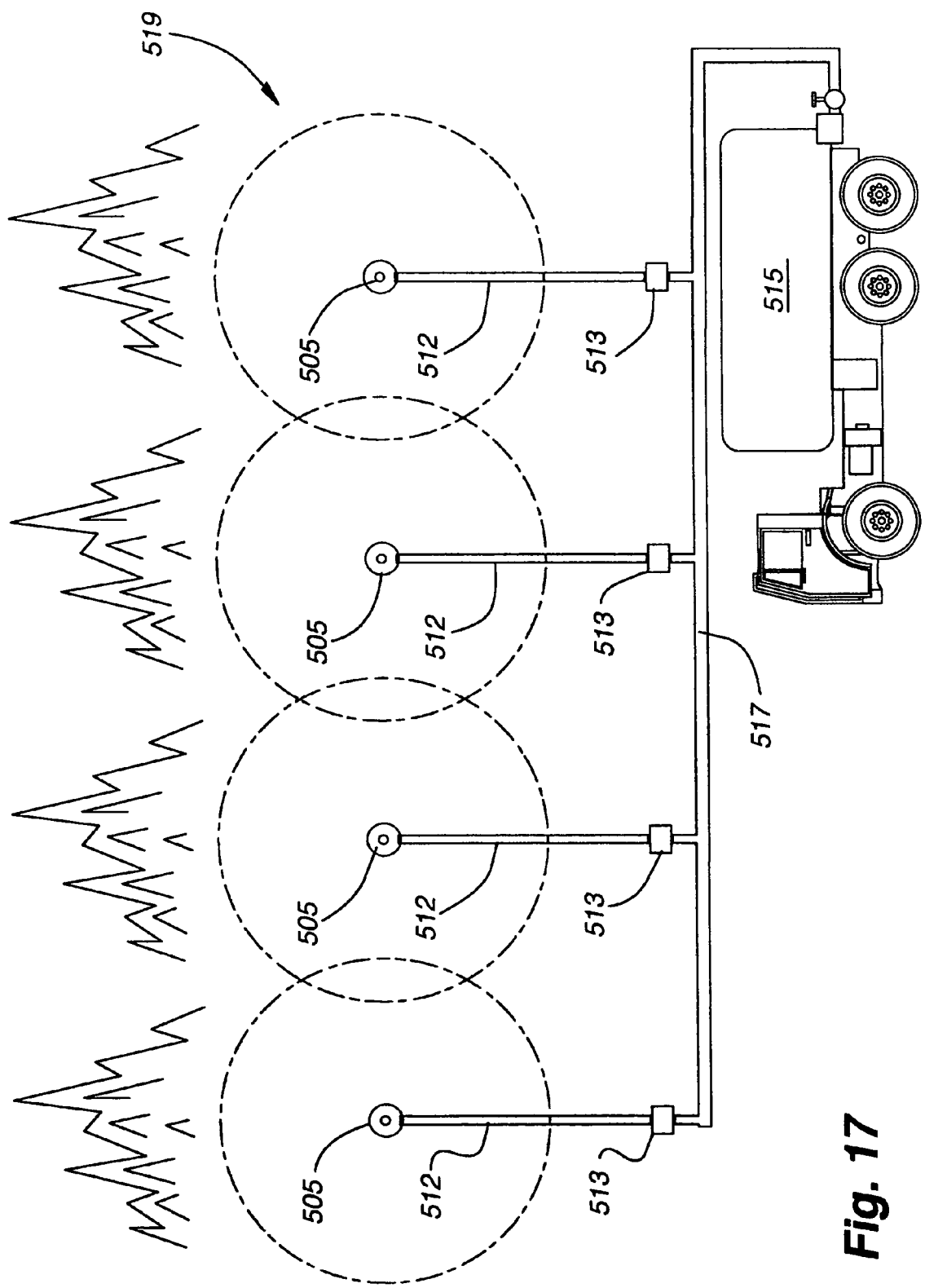
FIG. 17 illustrates a series of sprinklers arranged in a line to create a swath of land having high moisture content for use as a fire line according to one embodiment of the present invention, and one method for using the present invention.

A string of sprinklers incorporating the periodic valve assembly can be utilized to produce and maintain a "wet line" at a specified moisture level without excessive use of water. Sprinkler heads attached to the sprinklers can be utilized that broadcast water over relatively large areas that a wild fire could not easily jump. In one embodiment as illustrated in FIG. 17, a series of sprinklers 505, each having its own reservoir 512 and regulator valve 513 are attached to a pressurized source of water, such as a tanker truck 515, via a supply hose 517, wherein each sprinkler 505 operates independently of the others. As shown the FIG. 17, each sprinkler broadcasts water over circular area 519. An additional savings, such as about a 50% savings, in water for fire breaks can be realized by reducing the angular coverage of each sprinkler down to only 180 degrees. The semicircular sprinkling patterns obtained are sprinkler but then aligned along the axis of their diameters. This reduced area of coverage still results in a fire break over 30 feet wide, in one example, without changing the overlapping pattern of the sprinklers from the original full 360 degree arrangement. The coverage areas of neighboring sprinklers overlap to form a "fire line" of sufficient breadth.

Figure 18:
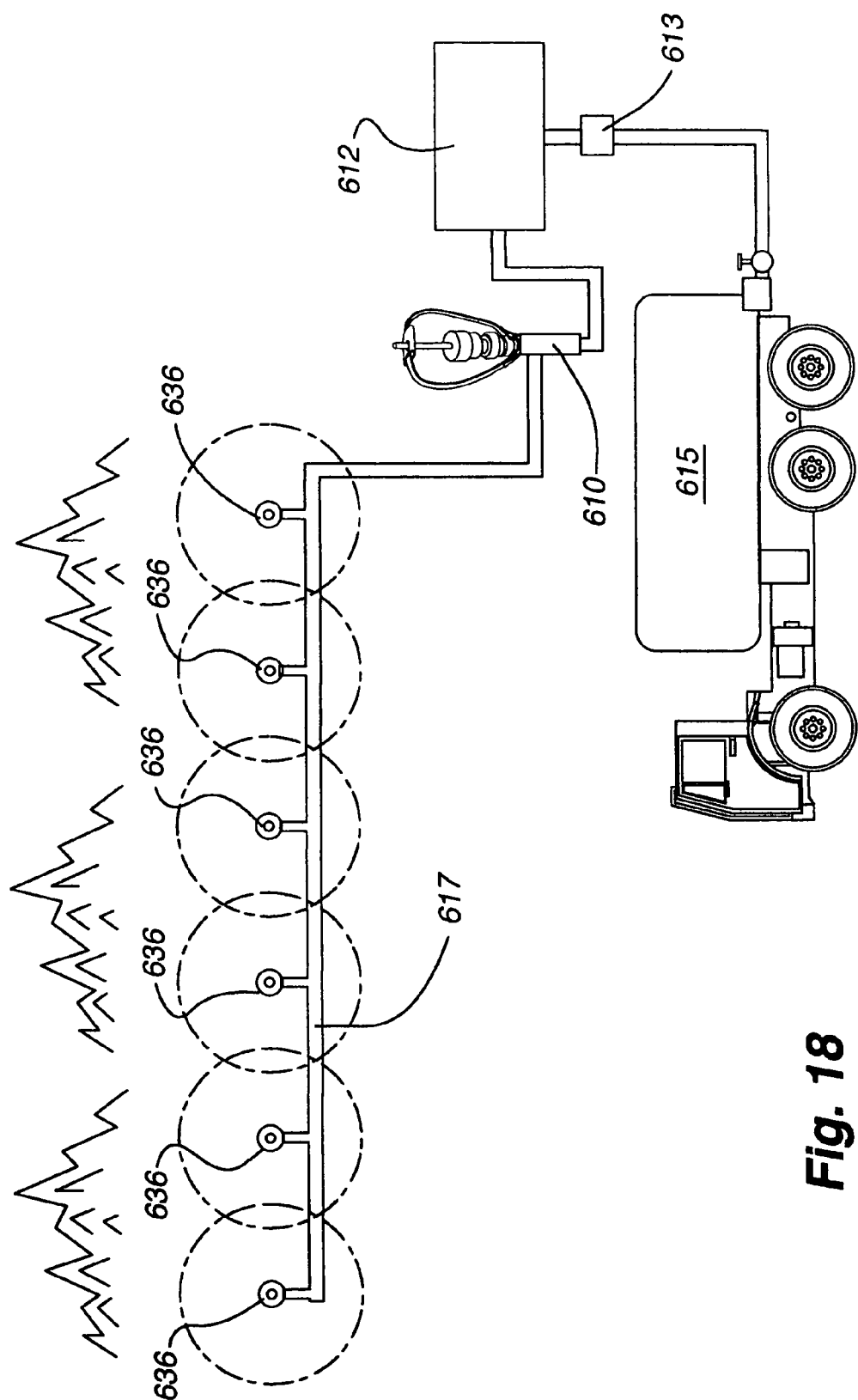
FIG. 18 illustrates a series of sprinkler heads attached together via a supply hose to a single periodic valve for use in a fire line according to another embodiment and method of the present invention.

In another embodiment as shown in FIG. 18, a series of sprinkler heads 636 are connected to a water supply hose 617 to form a line, and the supply hose 617 is connected to a single valve 610 of sufficient size to handle the volume requirements of all of the sprinkler heads 636 attached with the hose 617. The periodic valve assembly 610 is attached to a large reservoir 612, and the reservoir 612 is attached to a water supply 615 by way of a flow regulator 613.

Other Alternative Embodiments

Although the present invention has been described with a certain degree of particularity, it is understood that the present disclosure has been made by way of example, and changes in detail or structure may be made without departing from the spirit of the invention as defined in the appended claims.

Many of the specific components utilized in the described embodiments are merely exemplary and other components may be substituted for them without deviating from the scope of the invention. For instance, the O-ring seal can be replaced with any suitable type of sealing element that would prevent the fluid contained in the reservoir from flowing past it when the valve is in its closed position. Additionally, the materials that comprise the various components may vary. The valve housing which is made of Teflon™ in the embodiments described herein could be comprised of another polymeric material, such as ultra high-density polyethylene, or it could be comprised of a metallic material, such as brass. Likewise, the valve stem could be fabricated from a plastic or composite material instead of stainless steel.

The valve is described above primarily in terms of a sprinkler system for the irrigation of lawns, plants, and/or crops. In addition to serving this purpose, alternative embodiments of the sprinkler system may be utilized to scare away critters and varmints that might disturb plants and crops in the area surrounding the sprinkler. It can be appreciated that the noise emanating from the valve as it opens and closes may be relatively loud depending on how the valve is designed and that this noise can be used to startle animals. If additional noise is desired, other noisemakers, such as bells, may be affixed to the valve stem to create additional noise as the valve is actuated. In other embodiments, the valve may be used for purposes unrelated to sprinkler systems or irrigation. It is contemplated that the valve may be utilized in any number of applications where a periodic controlled release of fluid is required from a pressurized source. The fluid may be either liquid or gaseous or a combination thereof.

In one sense, the present invention is a valve for releasing a fluid from a pressurized source starting when the pressure in the reservoir reaches a first critical level and ending when the pressure of the fluid from its source drops below the critical level. The valve assemblies described above provide exemplary means for accomplishing the periodic release of a fluid from a pressurized source utilizing forces provided by weights and magnets. Other mechanisms, such as springs, electromagnetic, and the like, in lieu of magnets and weights are contemplated for providing a valve with similar functionality.

The present invention although described in an upright position wherein the valve stem moves up and down in the barrel may also be oriented in other positions. The principles described herein will work in a similar manner. The magnetic force, however, might require adjustment to account for differences in gravitational effect. The present invention is useful where any periodic liquid dispersal is desired.

I claim:

1. A device for the intermittent dispersal of a fluid, the device comprising:

a reservoir adapted to contain a compressible medium and to receive a fluid providing an increasing pressure in the reservoir;

a housing in fluid communication with the reservoir, the housing adapted to be in fluid communication with a source of the fluid, the housing in fluid communication with a liquid dispersion configuration;

a valve member at least partially contained within the housing, the valve member being movable (i) from a closed position to an open position when the pressure in the reservoir equals or exceeds a first pressure level, and (ii) from an open position to a closed position when the pressure is less than or equal to a second pressure level, the second pressure level being lower than the first pressure level; and wherein the valve member obstructs the flow of the fluid from the reservoir to the liquid dispersion configuration in the closed position and permits the flow of fluid from the reservoir to the liquid dispersion configuration in the open position.

2. The device of claim 1, wherein expansion of the compressible medium maintains the liquid contained in the reservoir in a pressurized state as the liquid is expelled from the reservoir outlet.

3. The device of claim 2, wherein the compressible medium is a gas.

4. The device of claim 2, further comprising a biasing mechanism providing a retention force to hold the valve member in the closed position against the fluid under increasing pressure from the reservoir whereby the valve member moves toward the open position when the retention force is met.

5. The device of claim 4, the biasing mechanism further providing a return force, whereby the valve member moves toward the closed position when the return force is met.

6. The device of claim 5, whereby the force created by the compressible medium at the first pressure level is substantially equivalent to the retention force.

7. The device of claim 6, whereby the force created by the compressible medium at the second pressure level is substantially equivalent to the return force.

8. The device of claim 5, wherein the biasing mechanism includes at least one magnet and at least one magnetic attractor, the at least one magnetic attractor being coupled with one of the housing and the valve member, the at least one magnet being coupled with the other of the housing and the valve member.

9. The device of claim 4, wherein at least a portion of the retention force includes a magnetic force between the at least one magnet and the at least one magnetic attractor when the valve member is in the closed position.

10. The device of claim 4, wherein the biasing mechanism includes a counterweight coupled with the valve member, and wherein at least a portion of the retention force is a gravitational force acting on the counterweight and the valve member.

11. The device member of claim 1, the liquid dispersion configuration comprising at least one sprinkler head.

12. The device of claim 1, the reservoir including an emitter for regulating the flow of fluid from the fluid source into the reservoir.

13. A device for the intermittent dispersal of a fluid, the device comprising:

a reservoir;

a housing in fluid communication with the reservoir, the housing adapted to be in fluid communication with a source of the fluid, the housing in fluid communication with a liquid dispersion configuration;

a valve member at least partially contained within the housing, the valve member being movable (i) from a closed position to an open position when the pressure of the fluid in the reservoir equals or exceeds a first pressure level, and (ii) from an open position to a closed position when the pressure of the fluid is less than or equal to a second pressure level, the second pressure level being lower than the first pressure level;

wherein the valve member obstructs the flow of the fluid from the reservoir to the liquid dispersion configuration in the closed position and permits the flow of fluid from the reservoir to the liquid dispersion configuration in the open position; and wherein the fluid pressure at the source of the fluid is substantially isolated from the change in fluid pressure at the liquid dispersion configuration when the valve member moves from the closed position to the open position.

14. The device of claim 13, whereby said change in fluid pressure at the liquid dispersion configuration is offset by the fluid pressure in the reservoir decreasing from the first pressure level to the second pressure level such that the pressure at the source of the fluid is not substantially affected by the change in pressure at the liquid dispersion configuration.

15. The device of claim 14, further comprising a biasing mechanism providing a retention force to hold the valve member in the closed position against the fluid under increasing pressure at the second port whereby the valve member moves toward the open position when the retention force is met.

16. The device of claim 15, the biasing mechanism further providing a return force, whereby the valve member moves toward the closed position when the return force is met.

17. The device of claim 16, wherein the biasing mechanism includes at least one magnet and at least one magnetic attractor, the at least one magnetic attractor being coupled with one of the housing and the valve member, the at least one magnet being coupled with the other of the housing and the valve member.

18. The device of claim 17, wherein at least a portion of the retention force includes a magnetic force between the at least one magnet and the at least one magnetic attractor when the valve member is in the closed position.

19. The device member of claim 13, the liquid dispersion configuration comprising at least one sprinkler head.

20. The device of claim 13, the reservoir including an emitter for regulating the flow of fluid from the fluid source into the reservoir.

* * * * *